United States Patent [19]

Foster et al.

[11] Patent Number: 5,940,490
[45] Date of Patent: Aug. 17, 1999

[54] CALL PROCESSING TO PROVIDE NUMBER PORTABILITY

[75] Inventors: Mark D. Foster, Sterling, Va.; G. David Butler, II, Fort Worth, Tex.; Sherman L. Ackley, Vancouver, Wash.; Bradley B. Baxter, Edmonds, Wash.; Kenneth A. Moisey, Olympia, Wash.; Kenith L. Mann, Portland, Oreg.

[73] Assignees: Stratus Computer Corporation, Marlboro, Mass.; U.S. Intelco, Lacey, Wash.; Electric Lightwave, Van Couver, Wash.

[21] Appl. No.: 08/519,061

[22] Filed: Aug. 23, 1995

(Under 37 CFR 1.47)

[51] Int. Cl.$^6$ .................................................. H04M 3/42
[52] U.S. Cl. ........................... 379/220; 379/207; 379/230
[58] Field of Search .................................. 379/219, 220, 379/221, 207, 211, 229, 230

[56] References Cited

U.S. PATENT DOCUMENTS

| | | | |
|---|---|---|---|
| 4,754,479 | 6/1988 | Bicknell et al. | 379/207 |
| 5,329,578 | 7/1994 | Brennan et al. | 379/211 |
| 5,583,926 | 12/1996 | Venier et al. | 379/207 |
| 5,661,792 | 8/1997 | Akinpelu et al. | 379/207 |
| 5,689,555 | 11/1997 | Sonnenberg | 379/211 |
| 5,696,816 | 12/1997 | Sonnenberg | 379/211 |
| 5,708,702 | 1/1998 | De Paul et al. | 379/207 |
| 5,717,749 | 2/1998 | Sneed, Jr. et al. | 379/207 |
| 5,768,358 | 6/1998 | Venier et al. | 379/207 |

Primary Examiner—Scott Wolinsky
Attorney, Agent, or Firm—Staas & Halsey LLP

[57] ABSTRACT

A method of routing a call including a called number in a communications network such as a Public Switched Telephone Network (PSTN), the method including determining if the called number is a network routing number indicating a specific switching node and line associated therewith in the communications network and routing the call within the communications network based on the called number when the called number is a network routing number. Additionally, the method includes identifying a network routing number based on the called number when the called number is not equal to the network routing number and routing the call within the communications network based on the identified network routing number.

16 Claims, 18 Drawing Sheets

Microfiche Appendix Included
(5 Microfiche, 413 Pages)

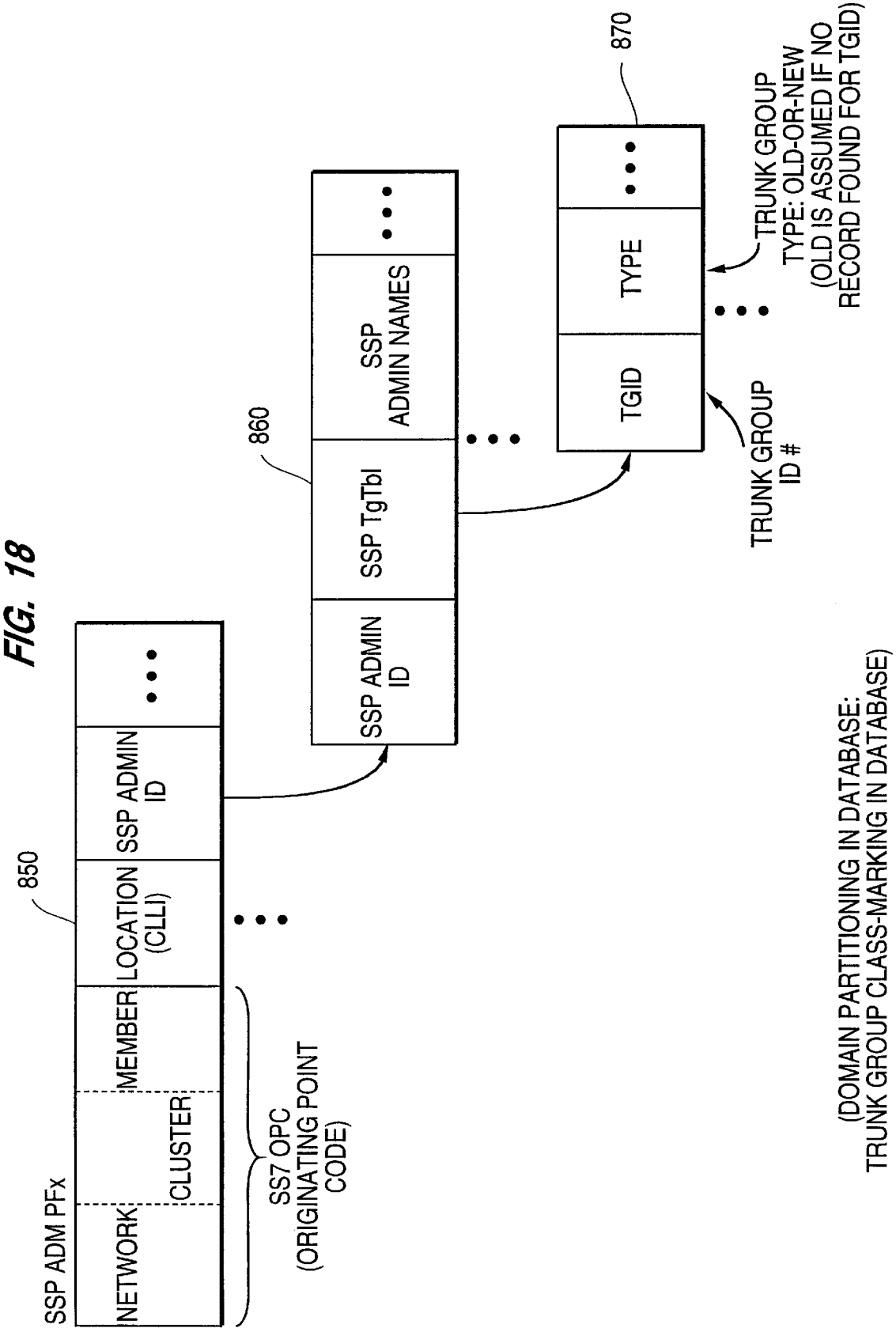

CALL PROCESSING TO PROVIDE NUMBER PORTABILITY

Reference To Microfiche Appendix A microfiche appendix having 5 microfiche and 413 frames is included herewith.

BACKGROUND OF THE INVENTION

1. Field of the Invention

The present invention relates to a communication network such as the public switched telephone network (PSTN) wherein call processing is carried out to allow local number portability among numbers ported or moved between an original switching node and another switching node and to allow subscribers within the communication network to maintain a particular telephone or similar network access number regardless of number relocation or porting within the communications network.

2. Description of the Related Art

In recent years there has been much discussion and effort to establish methodologies, systems and solutions to the numerous issues pertaining to station number portability or local area number portability. While many people agree that the central goal of local number portability is the provision of a local (geographic) number to a network subscriber that stays the same regardless of physical network, those same people have often disagreed as to a particular solution to the local number portability problem. Moreover, it is the fact that the public switched telephone network (PSTN) is a "legacy system" that exacerbates the issues pertaining to the provision of local number portability.

As such, many approaches have been proposed for providing local number portability. Some of these approaches typically have been concerned with providing "switch-wide" call routing solutions or other solutions wherein a network routing address is derived from or is numerically related to an originally dialed number. For example, some solutions have proposed elaborate plans that require transforming numbers from one dialing plan to another dialing plan, performing sophisticated mapping operations in relation to the transformed numbers and then performing routing that requires changes to existing switching and routing infrastructures.

With switch-wide solutions to providing local area number portability, for example, call processing and routing are achieved by routing a ported call to a particular end office system (e.g., a switching centers) for final call routing within that end office system.

One such switch-wide local number portability solution has been offered by AT&T which is disclosed in U.S. Pat. No. 4,754,479 to Bicknell, et al. filed Sep. 17, 1986, issued Jun. 28, 1988 and entitled "STATION NUMBER PORTABILITY." In particular, the '479 patent discloses a system where a station number portability arrangement is provided that allows a subscriber who is ported from an original switch to a new switch to retain his or her originally assigned number regardless of any numbering plan constraints. Moreover, the system of the '479 patent requires certain portability assumptions including that all switches that are capable of porting must be within a single portability cluster, that calls are to be routed to a particular destination switch and that the destination switch is capable of performing certain database operations to ultimately route a call to a particular line.

A system of the type described in the '479 patent has certain drawbacks including a course granularity in terms of ultimate line particularity (i.e., only switch-wide porting is possible as opposed to line-specific porting) and a requirement that each destination switch must be capable of performing certain database operations to perform a subsequent line-specific routing.

SUMMARY OF THE INVENTION

Accordingly, it is a primary object of the present invention to provide a local number portability solution that addresses the drawbacks associated with prior art call routing systems to provide number portability.

It is another object of the present invention to provide a local number portability solution that routes ported or relocated or moved numbers transparently of the telephone call routing scheme that is used to actually route a call within a particular switch at a particular end office.

It is a further object of the present invention to provide a local number portability solution that allows customers to retain an originally assigned number regardless of a change in service providers.

It is an additional object of the present invention to provide a local area number portability solution that allows network routing of calls including ported calls by without requiring a change in established numbering plans.

It is also an object of the present invention to provide a local area number portability solution that allows network routing of calls including ported calls without requiring a change in established numbering plans and which operates with current switching systems.

It is still a further object of the present invention to provide a local area number portability solution that allows network routing of calls including ported calls making certain assumptions about switching nodes and the routes on which calls are received at such switching nodes.

It is yet a further object of the present invention to provide a local area number portability solution where a customer number address is mapped to a network node address and where the customer number address and the network node address have the same format.

It is yet another object of the present invention to provide a local area number portability solution that allows network routing of calls including ported calls to a particular switching node and a particular line thereof in a communications network.

It is still a further object of the present invention to provide a local area number portability solution that may be used to provide line specific portable number routing.

It is a further object of the present invention to provide a local area number portability solution that may be used to provide switch-wide portable number routing.

These and other objects and advantages are achieved by the present invention by providing a method of routing a call based upon a call connection request including a called number in a communications network. The method includes a step of determining if the called number is equal to a network routing number and routing said call within the communications network based on the called number when the called number is equal to the network routing number. The method also includes the step of identifying the network routing number based upon the called number when the called number is not equal to the network routing number and routing the call within the communications network based on the identified network routing number.

The objects of the present invention are also achieved by providing A method of routing calls within a communications network interconnecting a plurality of switching nodes wherein at least some switching nodes of said plurality of switching nodes are capable of routing and terminating ported numbers. The method includes a step of generating a call connection request including a called number. Additionally, the method includes a step of determining if the called number matches a trigger indicating that the called number may be a ported number and routing the call based on the called number when the called number does not match the trigger. Also, the method includes the step of determining if the called number has been translated into a network routing number when it has been determined that the called number matches the trigger. Additionally, the method includes a step of translating the called number into a translated network routing number when it has been determined that the called number had not earlier been translated and routing the call based on the translated network routing number.

Finally, the objects of the present invention are further achieved by providing a method of routing a call including a called number in a communications network. The method includes the steps of determining if the call is from a first domain of the communications network and translating the called number into a network routing number when the call is from the first domain.

BRIEF DESCRIPTION OF THE DRAWINGS

The above-described objects and advantages of the present invention are described with reference to the appended drawing figures of which:

FIG. 18 is a diagram that illustrates a database architecture used to bring about domain partitioning according to the present invention.

DESCRIPTION OF THE PREFERRED EMBODIMENTS

Figure 1:
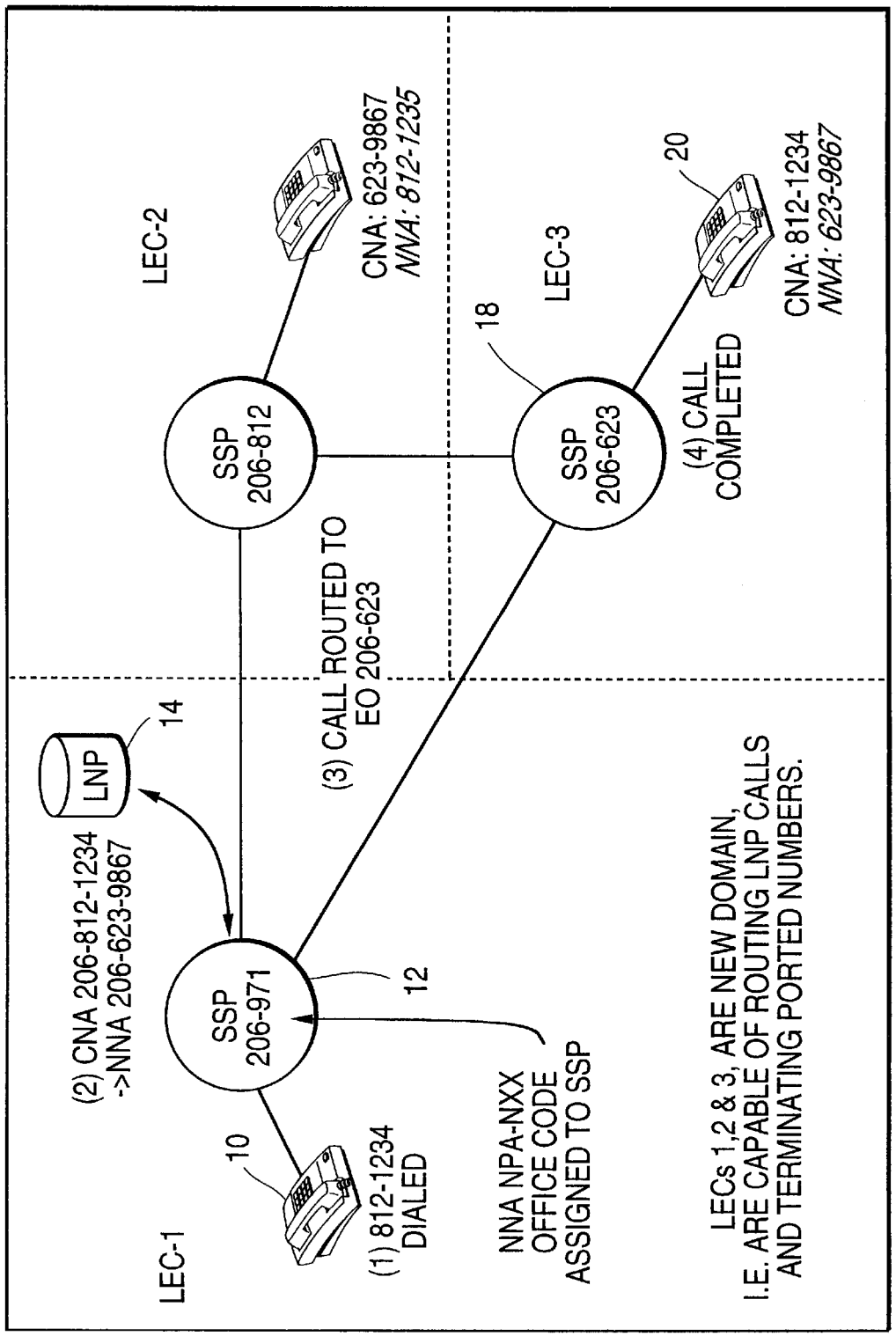
FIG. 1 is a call flow diagram of a call to a ported number in a communications network wherein local number portability is supported according to the present invention.

The presently preferred embodiments of the present invention are now described with reference to the appended drawing figures which were briefly described above. In the appended drawing figures and in the following paragraphs, like parts and items are referred to with like reference numerals and labels.

In reviewing the attached drawing figures and the discussion of the present invention as provided herein, it is important to keep in mind the following points. First, the present invention is directed to the topic of what is actually called "Geographic Number Portability" as distinguished from "station portability" as that term may be used in the art. That is, the present invention is directed to providing a portability solution for providing subscriber numbers wherein (1) such numbers are hierarchically routed, (2) numbers have a geographical significance, (3) such numbers are typically not of the 800, 700, 500 or 900 type, for example, and (3) such numbers contain a North American Numbering Plan (NANP) format wherein a translated NPA-NXX is uniquely assigned to a particular end office (EO) of the public switched telephone network (PSTN) (i.e., the communications network to which the present invention is directed).

Geographic number portability also has been termed "local number portability" and "local area number portability." As such, these terms for portability are treated herein synonymously. Second, the present invention provides number portability or local area number portability by de-coupling a user-dialable phone number (e.g., voice or data calls) from a network routing number that is used within the public switch telephone network (PSTN) to route and terminate a call. Today, the use of user-dialable numbers and network routing numbers are implicit throughout the PSTN and all related support systems. As such, since the user-dialable number and the network routing number are implicitly the same number which is directly tied to their serving facilities (i.e. the owning service provider), such numbers inherently are not portable.

As such, it can be said that portability fundamentally requires de-coupling the two identified uses of a number so that the same customer number (or Customer Name Address—CNA) may be associated with different service providers and hence different serving facilities (addressed by a Network Node Address—NNA) at different points in time. That is, different customer numbers can be assigned to the same station at different times. This decoupling enables the customer to keep his existing number and change service providers through a change in the database record that maintains the mapping between the customer's number (CNA) and his chosen serving facilities (NNA). Local area number portability therefore calls for the recognition that each of the two functions for a number (customer dialable access and network routing) creates two independent numbering plans, one for each function (i.e., a CNA numbering plan and a separate NNA numbering plan).

Third, a core distinguishing attribute of the present invention's solution to offering number portability is the proposed format for the network routing number of the NNA. It is well known that CNA's must continue to be the familiar 7/10 digit NANP numbers to prevent requiring customers or subscribers to change their numbers even once to obtain a portable number. The present invention supports number portability without requiring a change in customer's existing numbers. Moreover, NNAs within the present invention also use 10 digit routing sequences so that existing PSTN routing systems can be used for call routing, switch provisioning, switch translations and switch-based vertical services (e.g., CLASS). Furthermore, the present invention implements the NNA numbering plan as a separate, identical, number plan from the CNA plan. This incremental separation of dialing and routing functions of the 10-digit extends significantly extends the life cycle of the existing 10-digit NANP format for both uses and especially for dialable numbers. The long-term strategy of functional separation of the numbering space, as proposed by the present invention, isolates the 10-digit CNA universe of customer numbers from impacts resulting from the inclusion of new technologies such as a PCS and ATM into the PSTN.

Finally, the present invention is also theoretically based on the premise that routing numbers or NNAs identify both the terminating end office (EO) as well as the line/trunk termination, exactly as 10-digit numbers in the NANP do today. The use of 10-digit NNAs enables the deployment of service provider local number portability (LNP) with existing network infrastructure. Call translation state tracking mechanisms defined within the present invention enable NNA to be separated from CNAs thereby enabling number portability to be deployed without wasting precious NANP resources.

With the foregoing comments in mind, reference is now made to the drawing figures. Referring now to FIG. 1, therein depicted is an exemplary call flow diagram of a call routing scenario in a communications network system incorporating line-specific routing to achieve local area number portability according to the present invention. It is important to note that while line specific routing is used for purposes of illustration, it is to be understood that the ultimate routing paradigm that is incorporated into the terminating end office that ultimately routes the call to a ported number is independent of the present invention's ability to translate CNAs to NNAs. It is the provision of all relevant information including switching node and line identification information through use of a NANP like number in the form of the NNA that allows any routing paradigm to operate at an end office without requiring a change in infrastructure within that end office to be used. For example, the provision of a NANP like NNA routing number, as provided by the present invention, allows an end office, such as an office that may or may not be capable of porting or one that is capable of porting on a switch wide basis only or one that provides cellular routing, to properly route calls to subscribers affiliated with such an end office to be used. As such, it should go without saying that the embodiments discussed herein are meant to be applicable to any communications network having any sort of routing system that is compatible with the PSTN.

Figure 2:
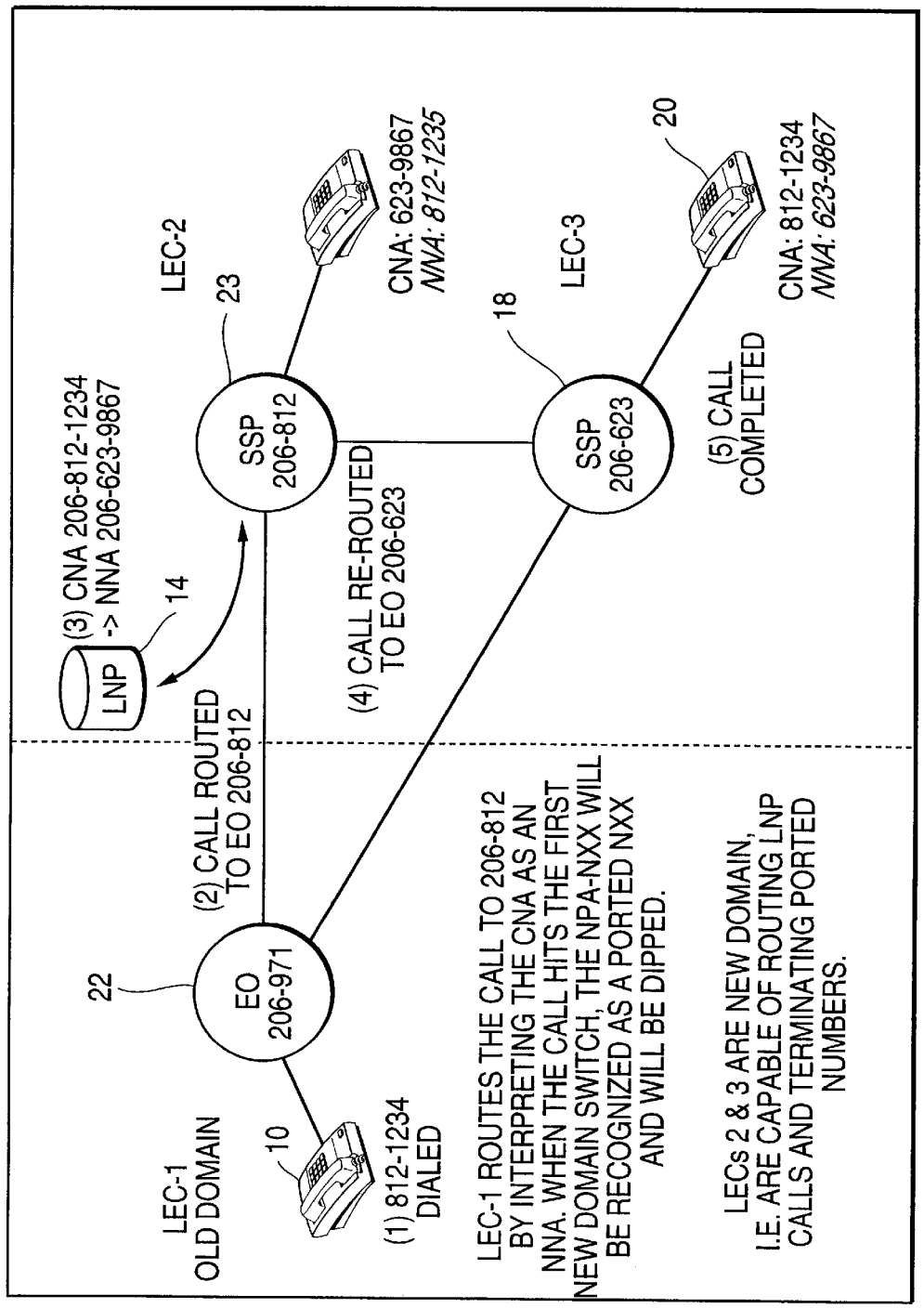
FIG. 2 is another call flow diagram of a call to a ported number in a communications network wherein local number portability is supported according to the present invention.
Figure 3:
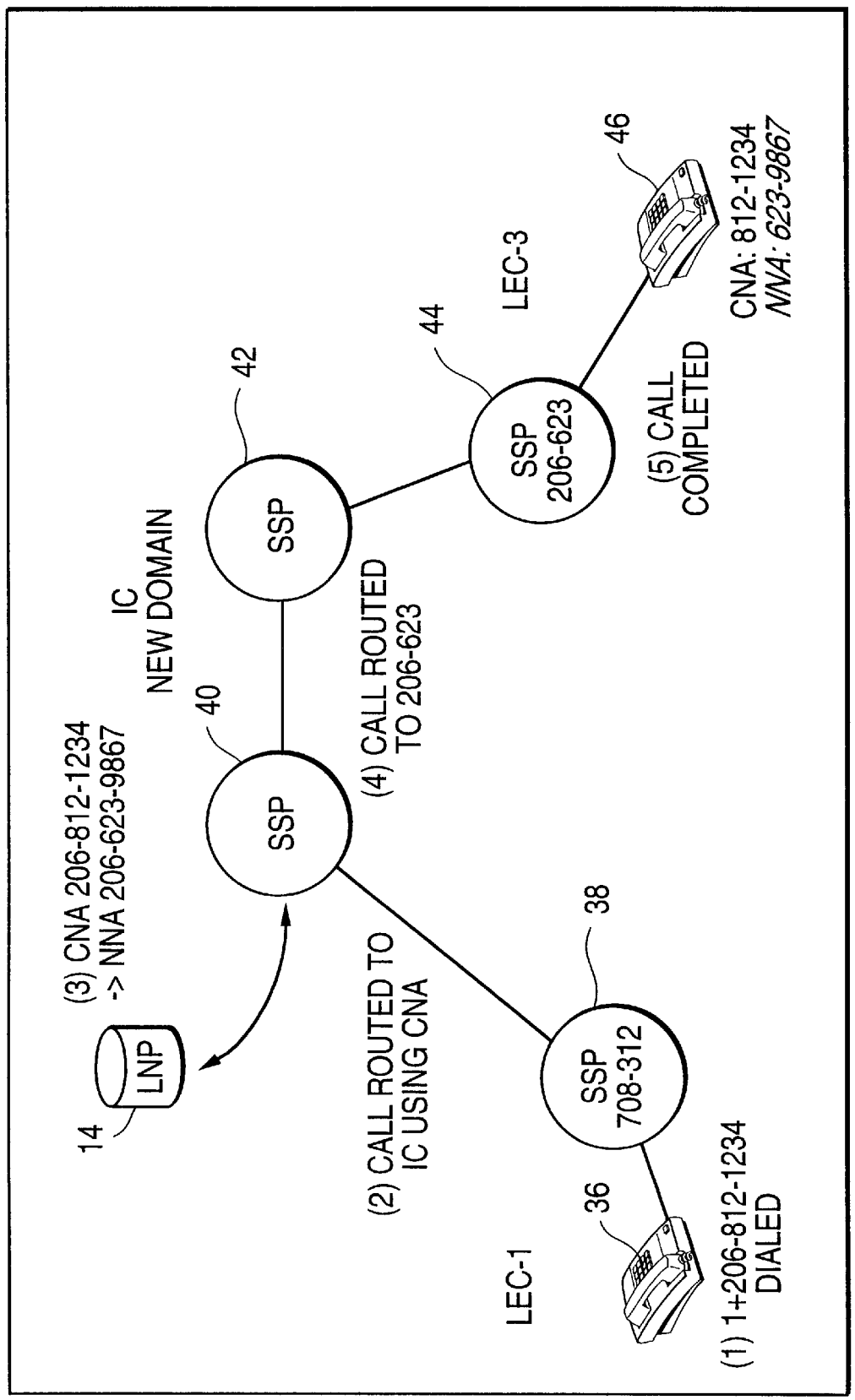
FIG. 3 is another call flow diagram of a call to a ported number in a communications network wherein local number portability is supported according to the present invention.

Additionally, FIGS. 1, 2 and 3, illustrate certain structures and corresponding operations that are carried out by particular computer hardware and software devices. For example, the item identified as LEC-1 refers to a local exchange carrier such as a Regional Bell Operating Company or RBOC. A typical LEC will have the necessary computer hardware and software to route and, possibly, translate calls. In particular, LEC-1 is shown to include a Service Switching Point or SSP 12 that is SS7 communications network compatible. A typical SSP will include a switching complex such as an AT&T 5E or DMS 100 and switching software commonly referred to as a "switching generic." The computer equipment associated with the switch of the SSP along with the switching generic are capable of detecting when database queries need to occur for a particular call to be routed through the switch (i.e., capable of detecting if a portability trigger condition is presented at the SSP by a call as discussed below in regard to FIG. 5, for example).

Additionally, a typical SSP will be able to suspend calls so that appropriate database queries for portability purposes can be sent to a service control point or SCP 14 (designated in the drawing as an LNP database for portability) that includes a database system and await for a response message therefrom. The SSP is also capable of processing calls based on the response message received from SCP 14.

The typical SCP 14 includes computer hardware and software for carrying out service control and database operations for a call. In particular, such computer hardware includes a central processing unit or CPU, a random access memory unit (RAM), disc storage and input/out (I/D) components that communicate via well known SS7 links.

Additionally, the computer software typically maintained at SCP 14 includes a database management system (DBMS) which may be RAM resident and which supports RAM resident operations for high speed database querying. Also, certain application processes for SS7 communications run on the SCP for performing such processes as number translation as defined by the present invention and for forming response messages and the like.

The hardware that is found at SCP 14 may include a STRATUS CONTINUUM 1245 computer and support peripherals. The software will typically include an operating system (OS) such as the FTX OS (i.e., a version of UNIX) and a DBMS such as ERDB as distributed by ATA, INC.

Each SSP in FIG. 1, as well as in FIGS. 2 and 3, will be connected or coupled to an SCP via the SS7 network via SS7 A-links which are well known.

The aforementioned structures operate as illustrated in FIG. 1, so that a call via a called number is initiated at a station 10 from an originating LEC. While station 10 is shown as being a telephone, it should be understood that station 10 may be any form of telephony device that is capable of initiating or forwarding a call within a communications network such as the PSTN. Moreover, it should be understood that station 10 may be capable of initiating or forwarding any type of call including data and fax calls over either plain old telephone service or POTS or over digital networks, such as over ISDN. Additionally, while it may be said that a particular station, such as station 10, has a fixed or specific line address within the communications network, it is the access number associated with any particular station, such as station 10, to which the present invention is directed.

Station 10 is associated with SSP 12 having an NNA NPA-NXX office code of "206-971." It will be understood that the SSP associated with the 206-971 office code is maintained by a local exchange carrier that is identified as "LEC-1." It should also be understood that the dialed number will be converted into an appropriately formatted (i.e., NANP 10-digit format) Customer Name Address (CNA) number in a conventional manner. The SSP 12 associated with LEC-1 is capable of routing and terminating ported numbers; that is, LEC-1 has a switching system that supports portability.

Figure 4:
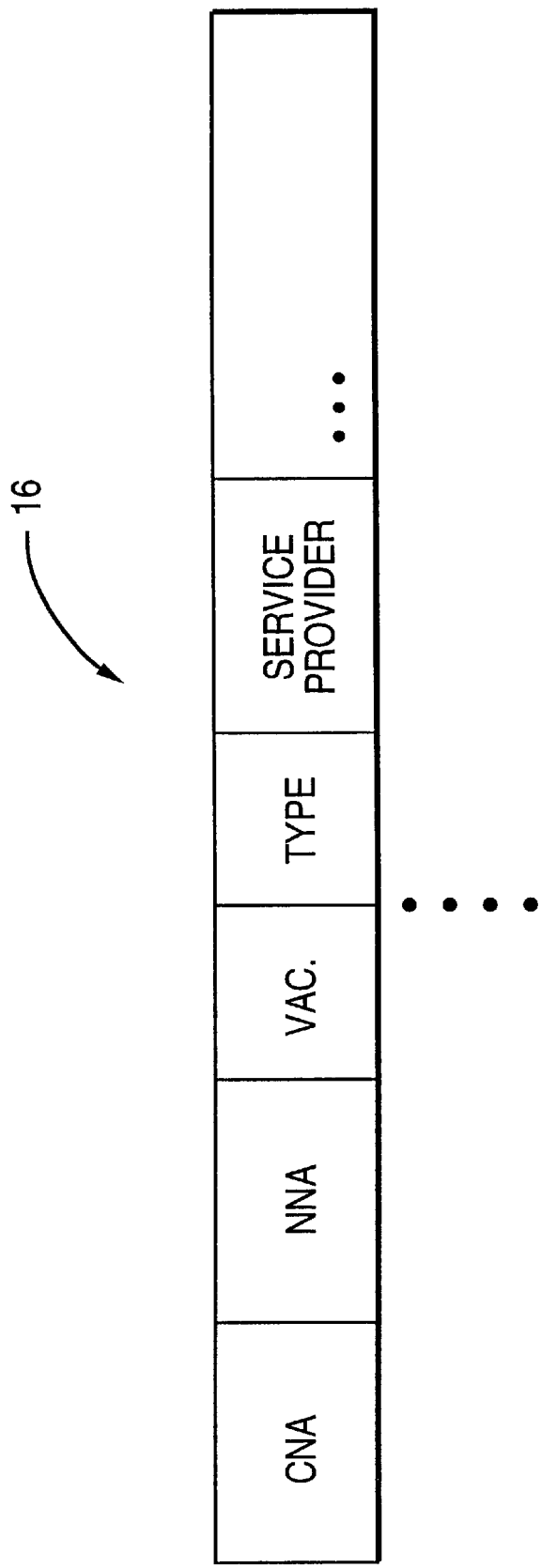
FIG. 4 is a diagram that illustrates a database construct to bring about number translation to derive a NANP format routing number for routing ported numbers according to the present invention.

At number (2) in the figure, a database access "dip" is performed to map or translate the CNA to a Network Node Address (NNA) number. The NNA also has a standard NANP 10-digit format. The table associated with the database lookups and queries to bring about mapping is illustrated in FIG. 4 as discussed below.

As such, in LEC-1 the CNA (i.e., the portable called party number (CdPN)) has been mapped to an appropriate NNA (i.e., 206-623-9867) which the communications network (e.g., the PSTN) may rely on to properly route the call to the end office switching node 18 in LEC-3 as illustrated by the line marked as (3). LEC-3 ultimately may be or include a cellular network for example. Moreover, it should be appreciated that the NNA contains both an end office code (i.e., a switching node address—206-623) and a line number associated therewith (i.e., line number 9867). Accordingly, the NNA is a routing number within the communications network that indicates a specific switching node 18 and a specified line or station 20 thereof to which the call should be properly routed. As mentioned above, the terminating access provider or end office switching node 18 (e.g., LEC-3) ultimately may not use all information contained with the NNA to route the call to subscriber station 20.

It should also be noticed that in LEC-1, the CNA (i.e., the formatted dialed number or CdPN in the figure) was examined and determined to be a possibly ported or relocated number. That is, the call parameters associated with the CdPN contained what is called a "trigger" indicating that a translation or "dip" should be done or should have been done to translate the CNA into an appropriate NNA. While triggering is an important part of the operations of the present invention, triggering techniques are well known and have received a significant amount of treatment by the industry. As such, many solutions to triggering have been proposed. For example, one such triggering approach has been proposed by Ericsson in U.S. Pat. No. 5,377,186 to Wegner, et al. entitled "SYSTEM FOR PROVIDING ENHANCED SUBSCRIBER SERVICES USING ISUP CALL-SETUP PROTOCOL" which approach is incorporated herein by reference.

Additionally, it should be noted that FIG. 1 illustrates a situation where a dip (i.e., a mapping from a CNA to an NNA) is performed in LEC-1 which is the next-to-last to the ultimate network (i.e., LEC-3) and switch 18 that will receive and terminate the ported call where the call is completed to station 20 at number (4) for station 20. This next-to-last approach is considered by the inventors to be a desired triggering location strategy which has been termed the "N-1 Policy." While it is desired to realize dipping or triggering at the N-1 network along the call path, it should be understood that there is no positive requirement that such should occur.

Also, FIG. 1 illustrates a communications network wherein three LECs are "new domain." That is, LEC-1, LEC-2 and LEC-3 are all capable of routing local number portable (LNP)calls and terminating ported numbers. Accordingly, for purposes of clarity, when the terms "new domain" and "old domain" are used throughout this document, the same are meant to refer to a group (i.e., new domain group) of switching nodes or networks (i.e., LECs and/or particular SSPs) that are capable of routing LNP calls and terminating ported or movable numbers and a group (i.e., old domain group) that is not so capable, respectively. The present invention is capable of routing calls regardless of the domain from which a call originates and regardless of the domain to which a call is to terminate because of the format of the present invention's NNA.

It should also be understood that while the present invention may be used to actually route calls in a communications network based on an NNA that indicates a specific switching node and a line thereof, the present invention is not so limited. That is, while the translation of a CNA to NNA includes determining a specific switching node and line thereof for terminating a call, the particular routing approach may use any part of the information contained within an NNA to route a call. It is the present invention's ability to provide a fine granularity in terms of its translation from CNA to NNA that supports a variety of physical translation schemes at a terminating end office. For example, the present invention now makes it possible to map or translate called numbers or CNAs into network routing addresses or NNAs that support physical call translations based on a line specific number portability translation paradigm, a switch-wide number portability translation paradigm or even a cellular network translation paradigm. Moreover, it should be understood that as new translation paradigms are developed and implemented, the present invention will support the same. It should be noted that routing is to be distinguished from translation and that translation should be understood to have no effect on the physical routing of calls within a communications network such as the PSTN. That is, the present invention maintains the independence of call routing from the interpretation and indication of the called party number (CdPN) at a terminating end office.

Finally, it should be understood from inspection of FIG. 1, and from FIGS. 2–3 as discussed below, that originally (e.g., prior to the advent of number portability) a CNA is equal to an NNA. Only after a porting from an original end office or LEC to another end office or LEC will there be a logical separation or porting of CNA to a physical routing number or NNA. For example, in FIG. 1, the subscriber having the number 812-1234 has ported or moved from LEC-2 to LEC-3. Moreover, the subscriber having the number 623-9867 ported or changed service providers by using LEC-3. In other words, FIG. 1 shows a situation where two subscribers cross-ported (i.e., relocated their respective NNA numbers) while maintaining their originally provided telephone numbers. As such, prior to any subscriber porting, the number 206-816-1234 originally indicated both a CNA and an NNA. Only after porting would a translation as provided by the present invention reveal that the CNA 206-812-1234 mapped to the NNA of 206-623-9687. As such, it should be appreciated that number portability can occur as a result of a subscriber electing to change their service provider, their geographic location or their type of service (e.g., plain or telephone service or POTS to a digital network such as ISDN).

Referring now to FIG. 2, therein depicted is a communications network that includes both new (SSP) and old domain (EO) switching systems. In particular, LEC-1 is an old domain switching node or end office 22 that has the NPA-NXX office code of 206-971. The dotted line in FIG. 2 illustrates a logical domain partition between an old domain and a new domain. As such, at number (1) when the call is initiated at a station associated with LEC-1 by dialing the number 812-1234, end office 206-971 or SSP routes the call at number (2) to an end office 23 with the NPA-NXX office code of 206-812 in a conventional manner. That is, LEC-1 does not have the ability to dip the call as it is in the old domain and, as such, LEC-1 routes the call to 206-812 by interpreting the CNA as an NNA as is done for non-ported numbers. This type of conventional routing (or routing based on the CdPN) is also a default condition for the present invention. It should be noted that it is the switch at the end office of LEC-1 that is not an LNP participating switch that makes LEC-1 part of the old domain.

In LEC-2 the SSP 23 including LNP 14 containing end office code 206-812 receives the call where the CNA has the NANP format and is equal to 206-812-1234. At LEC-2, the non-originating LEC, the CNA and the NPA-NXX of the CNA will be recognized as a ported NXX and a dip will be performed at number (3). As discussed with regard to FIG. 1, a dip is performed to map or translate the CNA to an appropriate NNA. Thereafter the NNA will be used to route the call to a particular switching node or complex and a particular line thereof. In this case, the dip performed by SSP 23 translates the CNA (206-812-1234) into the NNA of 206-623-9867. Accordingly, the communications network depicted in FIG. 2 will route the call to the SSP 18 in the LEC that maintains end office code 206-623. Additionally, the SSP 18 of LEC-3 may examine the NNA to determine the actual line number 9687 associated with LEC-3 to route the call to subscriber station 20. As such, SSP 18 of LEC-3 need not perform a database query to determine an appropriate line routing number as would be done in a switch-wide routing system. Instead, upon receipt of the call in LEC-3, SSP 18 of the LEC-3 will already know how to route the call based on the translation of the CNA to the NNA that occurred by way of the dip by the SSP 23 at LEC-2. However, as noted above, LEC-3 may utilize any particular routing paradigm to route the call and, as such, LEC-3 may utilize the NNA in any fashion. The present invention has achieved its routing objectives by properly mapping the CNA to an NNA. The actual routing paradigm that LEC-3 utilizes is not important.

As in FIG. 1, the communications network of FIG. 2, performed the dip at the N-1 network (i.e., SSP 23 of LEC-2) along the call path to route the call to the appropriate switching complex (i.e., SSP 18 of LEC-3 ). Again, while N-1 dipping is preferred the present invention is not to be so limited and it is to be understood that N-1 dipping is a desired policy for placement of the translation process.

Finally, at SSP 23 of LEC-3, the call is completed at number (5) to subscriber station 20 wherein the CdPN was translated from 206-812-1234 to the physical number 206-623-9867 and that station 20.

Referring now to FIG. 3, therein depicted is another exemplary call flow diagram of a call routing sequence wherein a portable number is mapped and routed to a particular network address and location. In particular, a long distance portable number call is initiated by dialing at number (1) at station 36 in LEC-1. Immediately, SSP 38 of LEC-1 recognizes that the dialed number contains a CNA that is a toll-call or long distance request. Accordingly, SSP 38 of LEC-1 routes the call the subscriber's pre-selected inter-exchange carrier (IC or IXC) in a conventional manner. The IC or IXC is often referred to as a preselected inter-exchange carrier or PIC. It does not matter whether LEC-1 is a new or old domain type as the initial routing in the present call flow diagram is to transmit the call to the IC in a conventional manner.

In FIG. 3, the IC (SSPs 40 and 42) is a new domain entity and is capable of dipping calls. It is noted that most, if not all, IXCs will be new domain participants in the PSTN. Accordingly, the IXC recognizes that the called party num-ber or CNA (206-812-1234) is a ported number therefore requiring translation via a database dip. As such, the dip is performed at the IXC at number (3) by SSP 40 to map the CNA to the appropriate 10-digit NNA 206-623-9867. Thus, the call will next be routed at number (4) by SSP 42 in a possibly conventional manner via SSP 44 at LEC-3 based on the NNA to the line numbered 9687 at the end office having the NPA-NXX office code of 206-623 where the call is completed or terminated at number (5) by a connection to station 46.

It should be noted that while the N-1 policy for dip placement at the next-to-last switching network is preferred. The dip in FIG. 3 was carried out at the first SSP of the IXC which ultimately caused the call to be routed through another SSP which actually routes the call. With IXCs, it very often will be the case that the N-1 policy cannot be achieved since such IXCs are often only coupled to a particular LEC or switch carrier which must route calls appropriately for such IXCs. In other words, as IXCs are dependent on particular LECs for routing and as IXCs cannot be connected to every LEC, there may often be the case that the N-1 policy cannot be enforced. Accordingly, it is the present invention's ability to determine if a call has already been dipped which is one of the things discussed in detail below that allows proper routing to occur regardless of whether the N-1 policy may be enforced.

At this point in the discussion of the present invention, it should be appreciated that it is the format of the NNA that allows any particular end office switching system of the communications network, including legacy systems, to route calls without requiring a change in numbering plans or numbering formats.

Referring now to FIG. 4, therein depicted is a database record format used by the present invention to map CNAs to NNAs during a dip process (i.e., during a process to translate a customer number address into a network node address that identifies a particular switching node and a particular line thereof to which a call should be routed). Database structure 16 defines one entry of a table indexed on CNA which contains records that define a mapping from CNA to NNA. Additionally, other fields such as Vacant (VAC.) and Type are maintained in the table and are described in detail below in regard to FIGS. 6–16. Also, database structure 16 includes a field identified as SERVICE PROVIDER which may be used to indicate the name or identifier of the provider for the ported or movable number which may also be used for routing purposes. It is important to note that the CNA and the NNA within the present invention bear the same format—that is, the CNAs and the NNAs of the present invention are formatted in a manner consistent with the NANP. As such, this distinguishing feature of the present invention allows number portability to be realized across legacy and state-of-the-art telephony switching platforms that may be found in the PSTN. Moreover, by decoupling the customer number and an associated network routing number portability is achieved. Additionally, by maintaining a paradigm that the NNAs within the portability approach look like NANP numbers, a graceful transition to number portability can be achieved by the present invention.

Referring now to FIGS. 5–17, therein depicted are flow charts that illustrate the operations of the present invention to provide local area number portability. The flow charts of FIGS. 5–17 and the discussions herein are meant to summarize the actual routines that have been implemented in computer software to control appropriate computer hardware and switching technologies to bring about local number portability and which have been attached to this document in the form of an appendix that was particularly identified above. For a detailed understanding of the implementation details of the various routines illustrated in the flow charts and/or mentioned herein, the reader is directed to the above-mentioned appendix.

Figure 5:
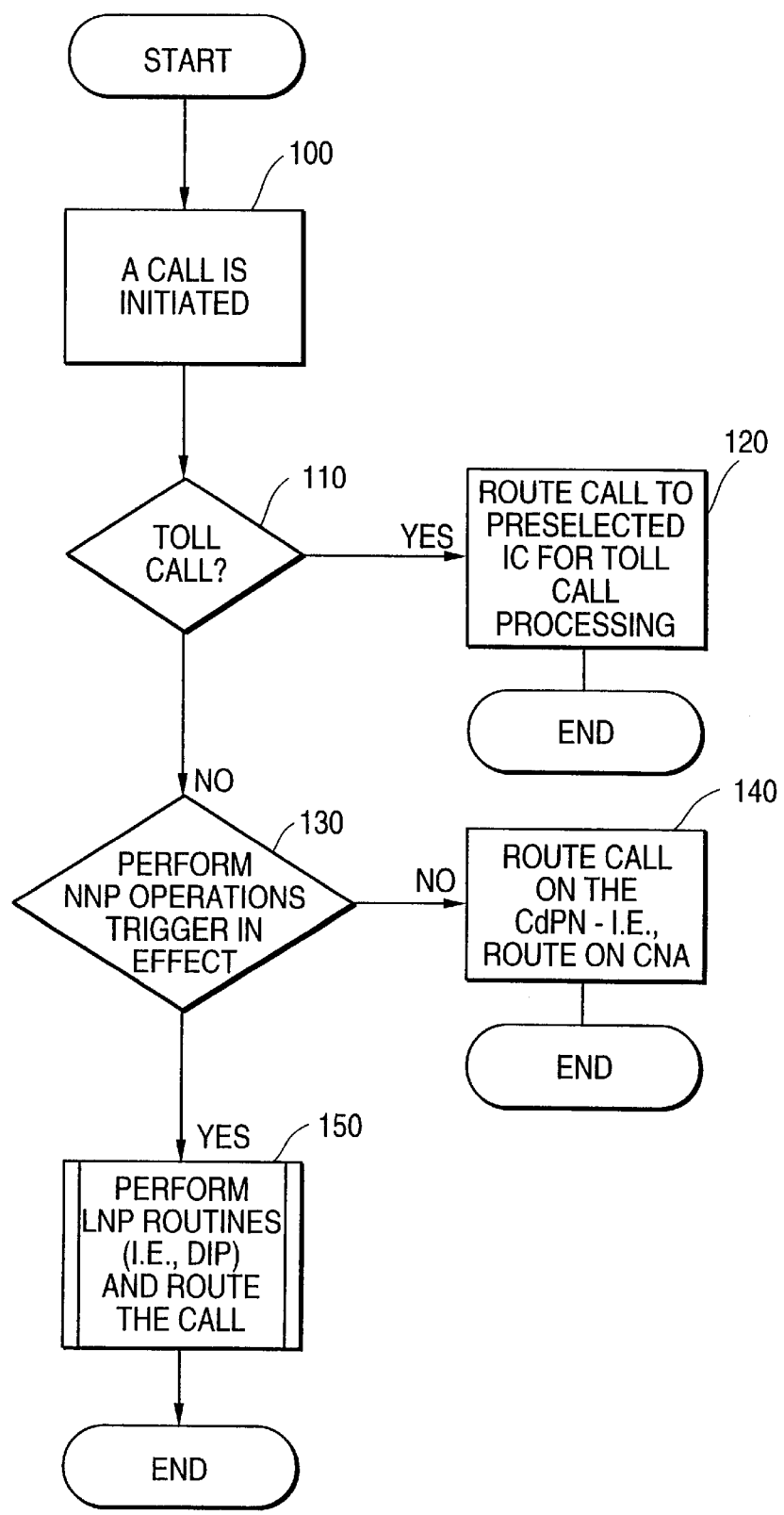
FIG. 5 is a high-level flow chart generally illustrating the operations of the present invention to bring about local number portability.

Referring now to FIG. 5, therein depicted is a high-level flow chart generally illustrating the operations of the present invention carried out at a switching node such as a LEC or IC to bring about local number portability in a communications network such as the PSTN wherein a call is initiated either from an originating subscriber or from a switch that is referred to as being upstream along the call path.

A call is initiated at step 100. The initiated call may include a ported or movable number such as 812-1234 which will be converted to a NANP number format containing a 10-digit number sequence in a conventional manner (i.e., the end office code of the NPA NXX office code will be added to the initiated call or dialed number). Thereafter, a determination is made at step 110 as to whether the dialed number is a toll call in a conventional manner (e.g., does the call contain a "1 plus" sequence?). If the call is a toll call such as a long distance call, processing proceeds to step 120 wherein the call including the CNA are routed to an IC or IXC for appropriate routing and call processing. It should be appreciated that as the flow charts of FIGS. 5–17 are meant to depict processing at any point along a call path, the IXC would certainly cause an instance of the processing depicted within FIGS. 5–17 to occur. Accordingly, it should be understood that the IC or IXC may or may not dip a call to translate a CNA to a NNA for appropriate call routing.

If the call is not a toll call, processing proceeds to a determination at step 130 as to whether local number portability (LNP) routines should be performed in relation to the called party number (CdPN) or CNA. In other words, step 130 determines by examining the CNA whether the CNA contains a trigger indicating the presence of a possibly ported number. Another way to look at the processing of step 130 is to say that at this step, a determination is made as to whether the CdPN is a CNA or NNA.

If LNP operations are not necessary (e.g., in the case that the called party number immediately maps to a line that is present on the switching node that handled the call initiation such as directory assistance, for example), then call processing continues at step 140 wherein the call is conventionally routed based on the CdPN which is the CNA.

If LNP operations are necessary (i.e., a trigger is in effect and the CdPN or CNA is to be translated to an NNA because the called party has ported or moved to another LEC or service system), processing proceeds to step 150 where LNP routines are performed to translate the CNA to an NNA (i.e., the call is dipped) and the call is routed appropriately. As noted above, the mapping from CNA to NNA is one in which the CNA is mapped to a particular switching node and a particular line associated with that switching node to provide line specific routing, if possible.

Thereafter, processing ends and a dialed number (i.e. CdPN) will appropriately routed in the communications network of the PSTN via a CdPN routing algorithm.

Referring now to FIGS. 6–17, therein provided are flow charts to illustrate in detail the operations generally depicted in FIG. 5. In particular, a call is initiated at step 200 as described above. It is not important whether the call is a voice call or a data call. Only the dialed number as it relates to a CNA is important.

At step 210 a determination is made as to whether the dialed number is a toll call. If the dialed number is a toll call, the call is routed to a PIC (pre-set or preselected interexchange carrier) for toll call processing and routing. As noted above, the PIC may also be set up to dip calls to translate CNAs to NNAs as provided herein.

If the dialed number is not a toll call, processing proceeds to step 230 where a determination is made as to whether the dialed number (as in the form of a CNA) contains a trigger as suggested above. The routines to determine if a trigger is in effect are discussed below with regard to FIGS. 9 and 10. If no trigger is in effect (i.e., the call cannot be a ported number), processing proceeds to step 240 where the call is routed on the called party number (i.e. CdPN) in a conventional manner.

If a trigger is in effect (i.e., the dialed number may be a ported number), processing proceeds to step 250 wherein a database query is launched (i.e., a dip is performed) to translate the CNA to NNA or to determine that a dip had already occurred at a previous place in the call path and that the number in the CdPN field of the call signalling protocol is already an NNA. The details of performing a dip are discussed below with regard to FIGS. 11, 12 and 13. It is important to note, however, that it is crucial to be able to determine if a call has been previously dipped as redundant dipping and dipping on an NNA can lead to problems including wasteful allocation of system resources such as database operations and erroneous mapping leading to erroneous call routing. The present invention provides solutions to such problems which are discussed below with regard to FIGS. 14–15 and which provide for accurate routing regardless of redundant dipping.

Figure 7:
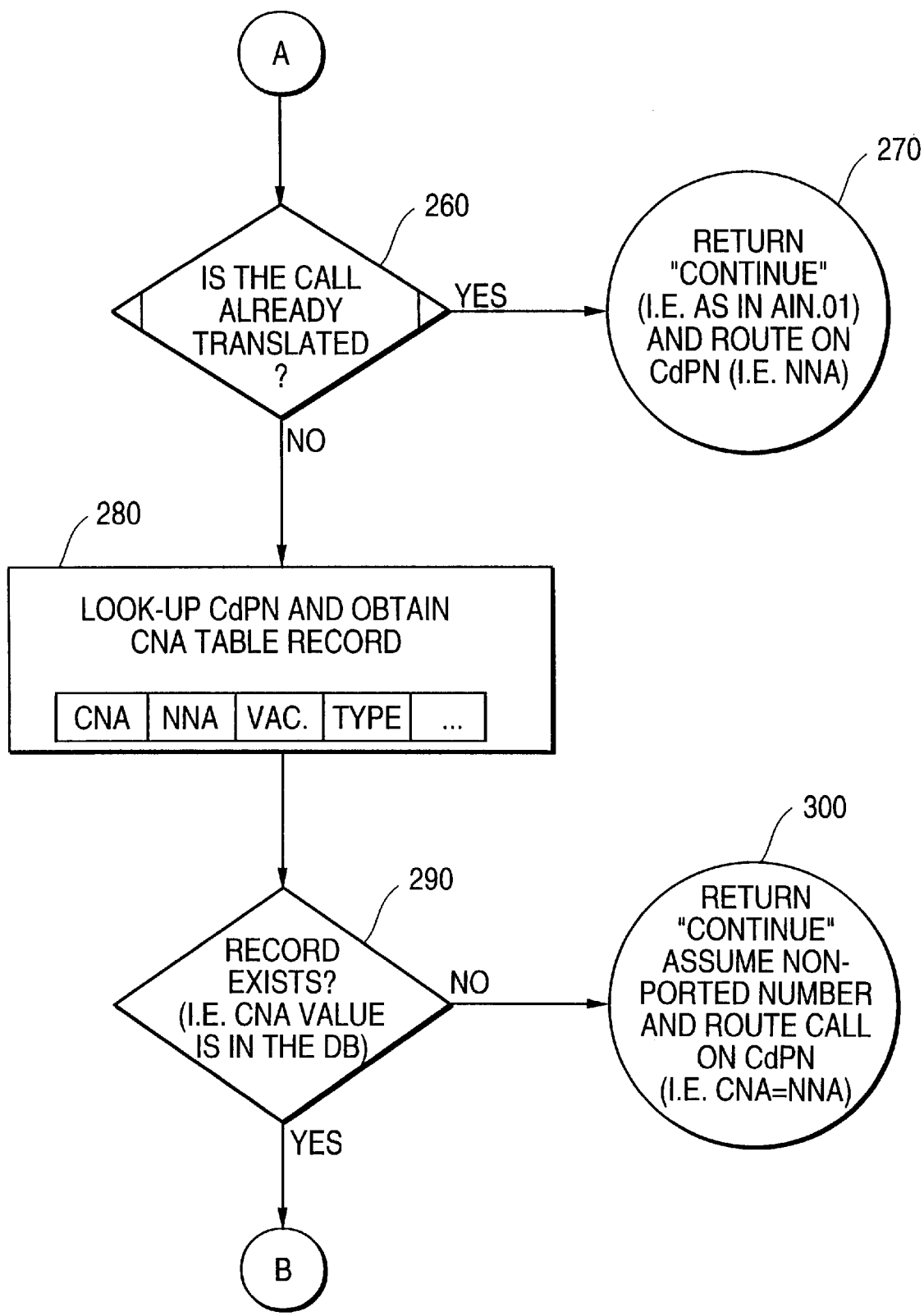
FIG. 7 is another flow chart that illustrates in detail the operations generally depicted in FIG. 5.

In FIG. 7, processing proceeds at the SCP (i.e., in the database) and to step 260 where, as suggested above, a determination is made as to whether the call and the CNA as formed by the providing LEC has already been translated. If the call has already been translated processing proceeds to step 270 where a RETURN code is returned in the communications network as in the case of the AIN 0.1 protocol and the call is routed on the CdPN which has been replaced with an appropriate NNA that indicates a particular switching node and line thereof for terminating the call.

If the call is not translated, processing proceeds to step 280 where a scan of appropriate databases maintained at current switching node for a CNA table record is performed. The databases maintained at the current switching node are duplicates of databases that a party such as a regional third party maintains to provide local number portability. It is not important to the present invention as to who or what entity actually maintains the original mapping tables. All that is important is that the current switching node that is capable of performing the dip has such a mapping table available for processing.

At step 290 a determination is made as to whether a CNA table record was found as a result of database operations. If a CNA table record does not exist, processing proceeds to step 300 where a RETURN code is returned as in the case of the AIN 0.1 protocol and the CNA is assumed to be non-ported and the call is routed on the CdPN (i.e., the CNA is the NNA) in this case.

Figure 8:
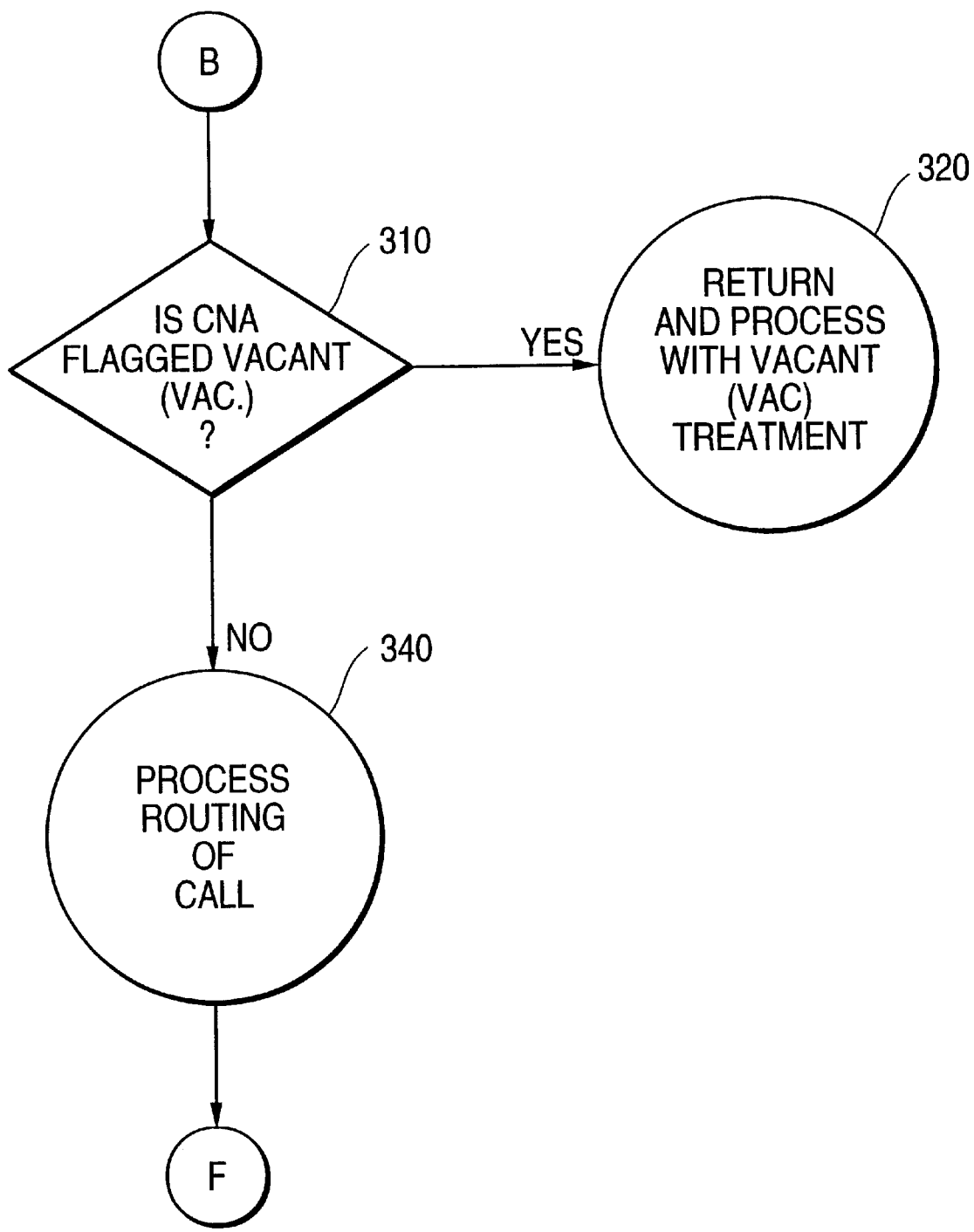
FIG. 8 is another flow chart that illustrates in detail the operations generally depicted in FIG. 5.

If the CNA table record exists, processing proceeds to step 310 in FIG. 8. At step 310, a determination is made as to whether the CNA table record indicates that the CNA is flagged as Vacant (i.e., no destination address is associated with the dialed number). If the CNA is flagged Vacant, processing proceeds to step 320 where a RETURN code is sent back from the database service processing the dip and the call is provided with a Vacant Call Treatment such as a recording that indicates that "YOUR CALL COULD NOT BE COMPLETED AS DIALED PLEASE TRY YOUR CALL AGAIN."

Figure 16:
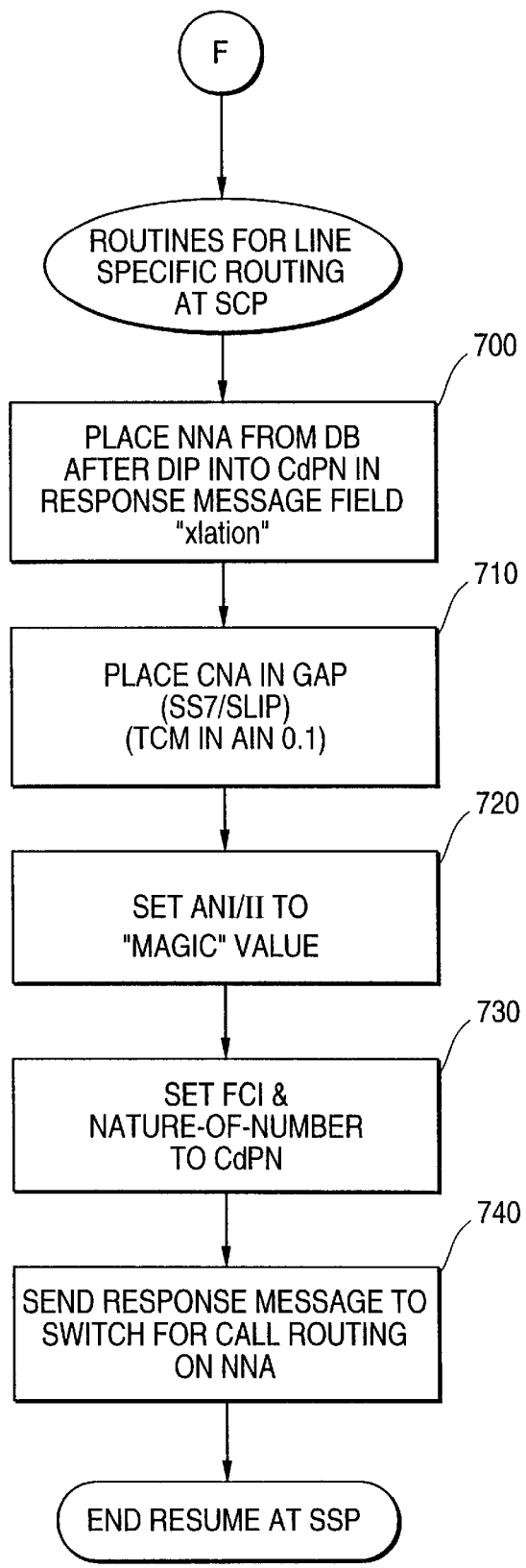
FIG. 16 is a flow chart that illustrates the routines carried out by the present invention to provide line-specific portable number routing.

If the CNA is not flagged as Vacant, processing proceeds to step 340 where call routing is achieved as further illustrated and discussed in regard to FIG. 16.

Figure 6:
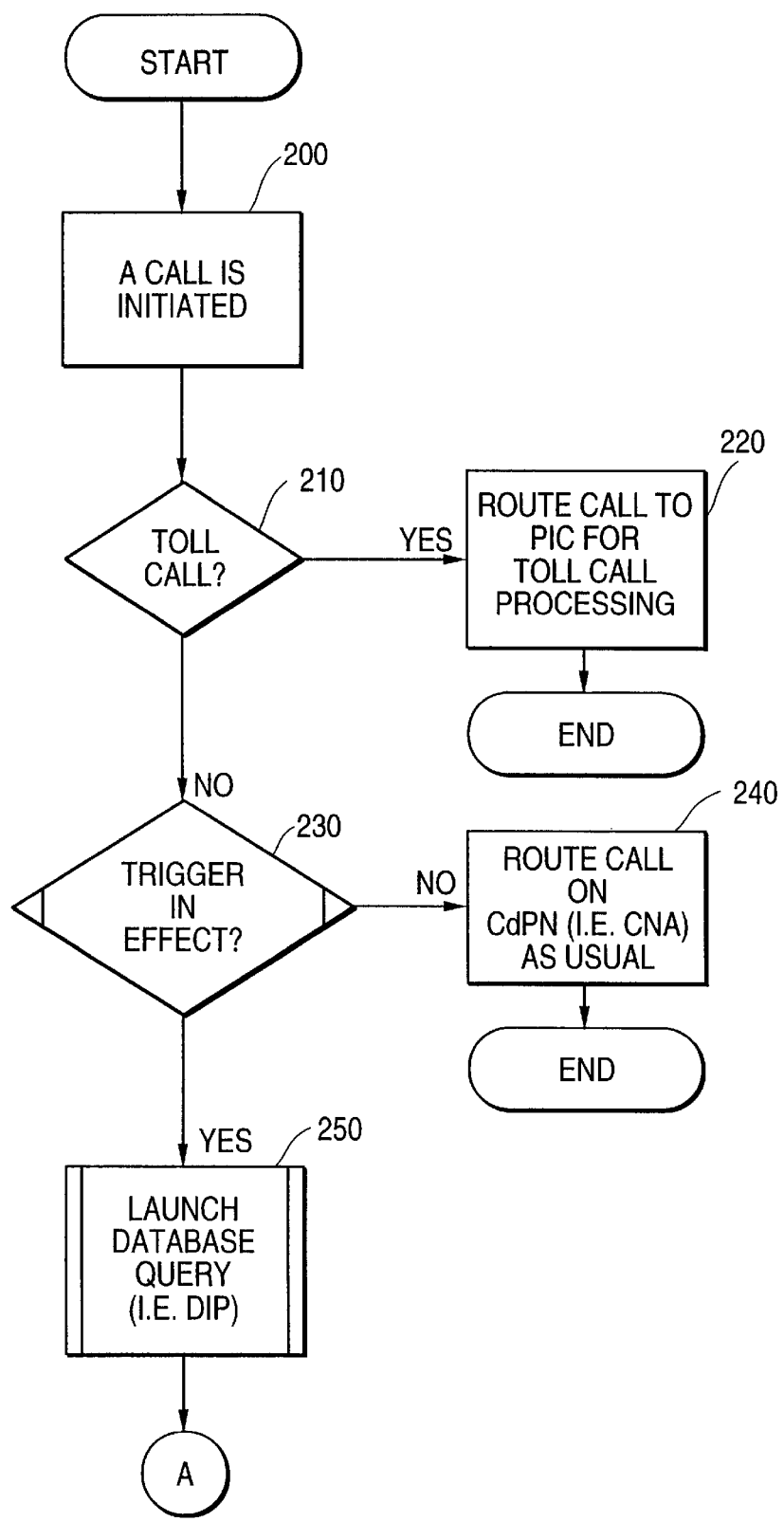
FIG. 6 is a flow chart that illustrates in detail the operations generally depicted in FIG. 5.
Figure 9:
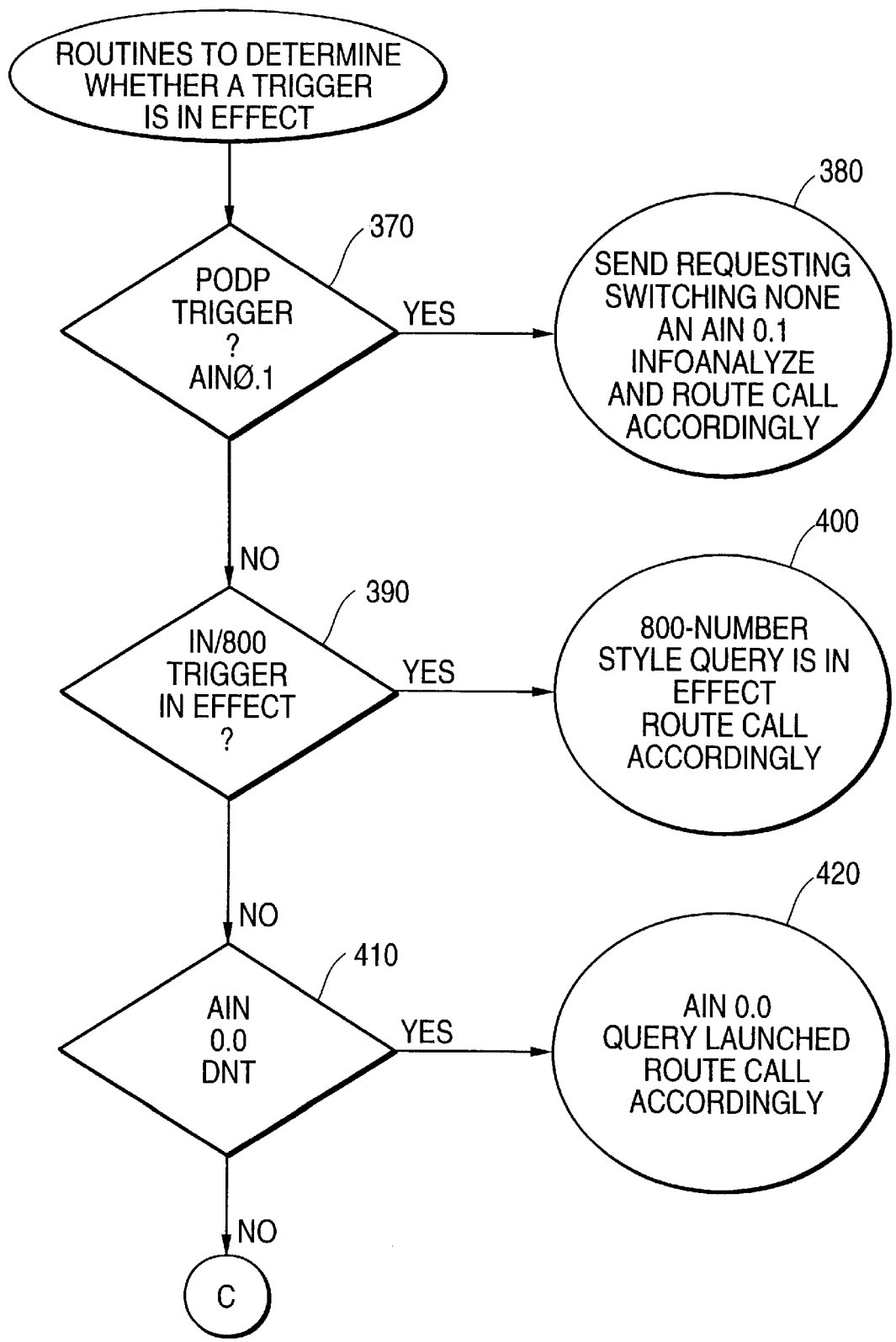
FIG. 9 is another flow chart that illustrates in detail the operations generally depicted in FIG. 5.
Figure 10:
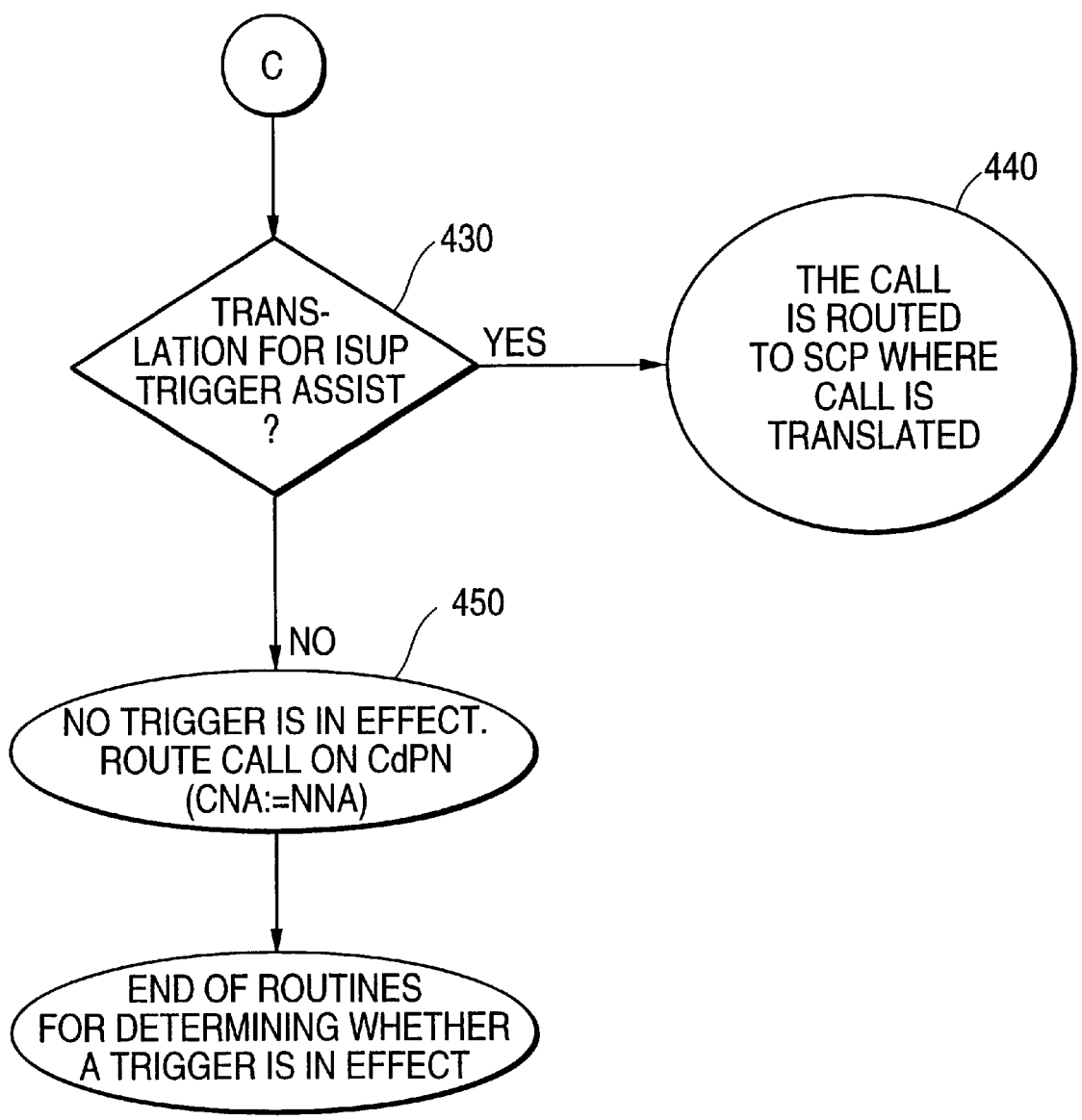
FIG. 10 is another flow chart that illustrates in detail the operations generally depicted in FIG. 5.

Turning now to FIGS. 9 and 10, the flow charts provided therein are expansion flow charts for step 230 as shown FIG. 6. In particular, FIGS. 9 and 10 illustrate the routines that may be carried out to determine whether a trigger is in effect. That is, the steps carried out in the flow charts of FIGS. 9 and 10 determine if the call parameters associated with the call and the called party number (CdPN) as formed into a NANP like CNA contain an indication that the CdPN is a ported number. The steps may be carried out in any sequence.

In particular, at step 370 of FIG. 9, a determination is made at the SSP level as to whether the CNA contains a public office dialing plan (PODP) trigger according to the AIN 0.1 call processing protocol, incorporated by reference herein. The acronym AIN stands for Advanced Intelligent Network. If such a trigger is in effect, the database query processor determining if a trigger is in effect (i.e., a module that communicates with the particular switching node that is now handling the call along the call path) sends the switching node now handling the call along the call path an AIN 0.1 INFOANALYZE instruction message and the call is routed accordingly. Such call routing will be apparent to those skilled in the art.

If a public office dialing plan (PODP) trigger is not in effect, processing proceeds to step 390 where a determination is made as to whether an IN/800 style trigger is in effect in relation to the CNA. If an IN/800 trigger is in effect, processing proceeds to step 400 where an 800-number style query is handled by an appropriate processing unit that is well known in the art and the call is routed accordingly.

If an IN/800 trigger as defined in Bell Core Document # TR-NWT-000533, incorporated by reference herein, is not in effect, processing proceeds to step 410 where a determination is made as to whether an AIN DNT trigger is in effect in relation to the CNA. If such a trigger is in effect, an AIN 0.0 query is launched in a conventional manner and the call is routed accordingly.

If an AIN 0.0 trigger as defined in Bell Core Document # TR-NWT-001284, incorporated by reference herein, trigger is not in effect in relation to the CNA or dialed number as formatted into a NANP 10-digit number, processing proceeds to step 430 in FIG. 10. At step 430, a determination is made as to whether a translation of the CNA to an NNA should be done based on an ISUP trigger assist approach. If ISUP trigger assist processing is to occur based on the CNA, processing proceeds to step 440 where the call is routed to an SCP or SSP where the CNA can be appropriately translated (i.e., where the CNA can be mapped to the NNA).

If ISUP trigger assist processing is not to occur, processing proceeds to step 450 where no trigger has been determined to be effect in relation to the CNA and the call is routed on the CdPN and the CNA can be thought of as the NNA. In other words, the CNA will not be subsequently mapped as number portability is not desired and the call is routed on the 10-digit CNA in a conventional manner.

It should be understood that triggering is not limited to the approaches illustrated in FIGS. 9 and 10. The trigger determinations for determining whether to carry out number portability operations with regard to a particular CNA at an arbitrary point in a call path may involve any type of trigger which network operators believe optimizes the determination process. In particular, it is presently envisioned that new triggers will be developed and deployed at switching nodes that are especially optimized for triggering to number portability processes. While triggering is a critical element of any number portability approach and solution, it is well known that triggering techniques are really switch vendor issues which will be carefully developed as number portability becomes implemented. For a further discussion of triggering techniques, the reader's attention is directed to U.S. Pat. No. 5,377,186, to Wegner, et al. entitled "SYSTEM FOR PROVIDING ENHANCED SUBSCRIBER SERVICES USING ISUP CALL-SETUP PROTOCOL" which is incorporated herein by reference.

Figure 11:
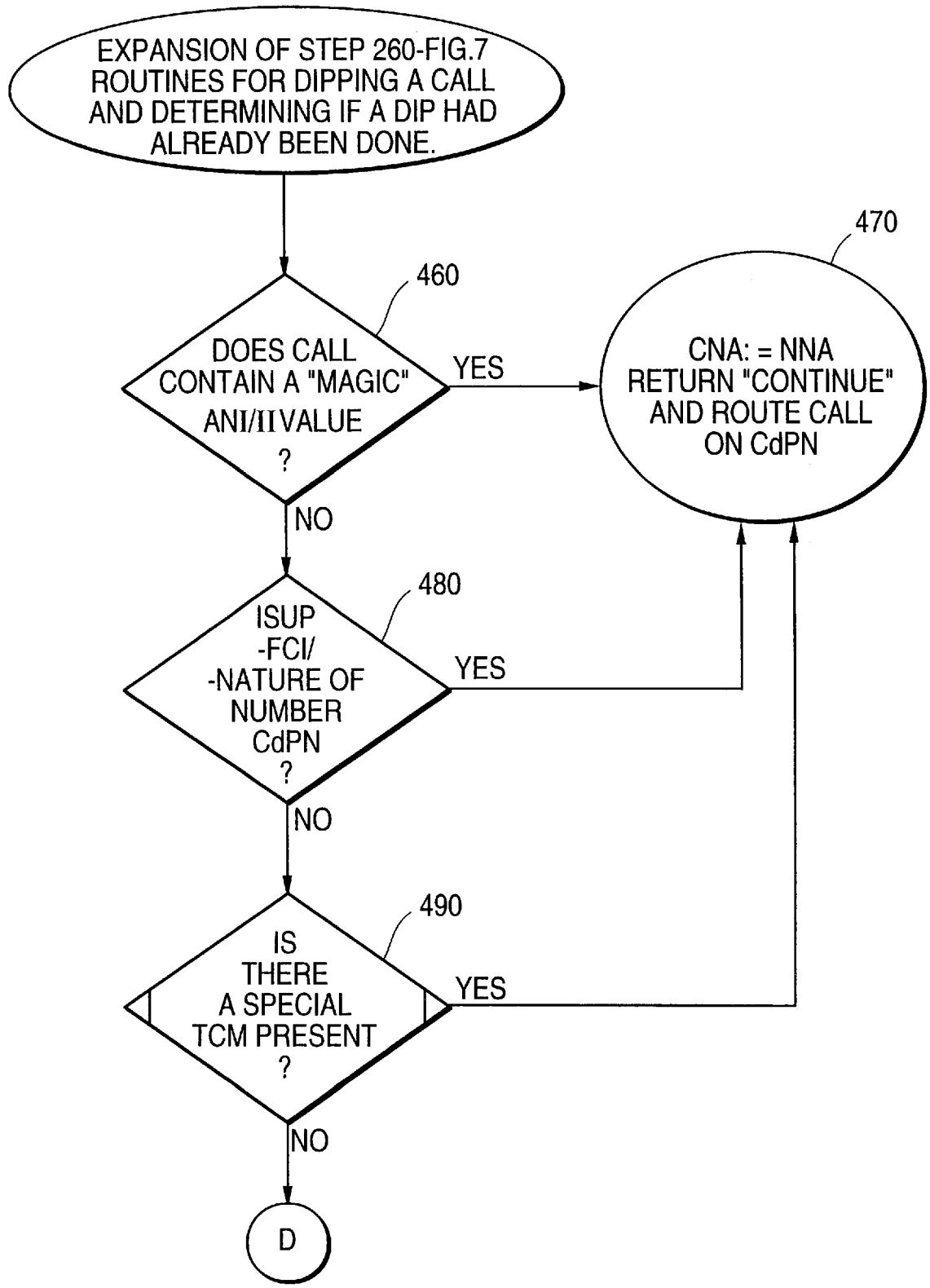
FIG. 11 is another flow chart that illustrates in detail the operations generally depicted in FIG. 5.
Figure 12:
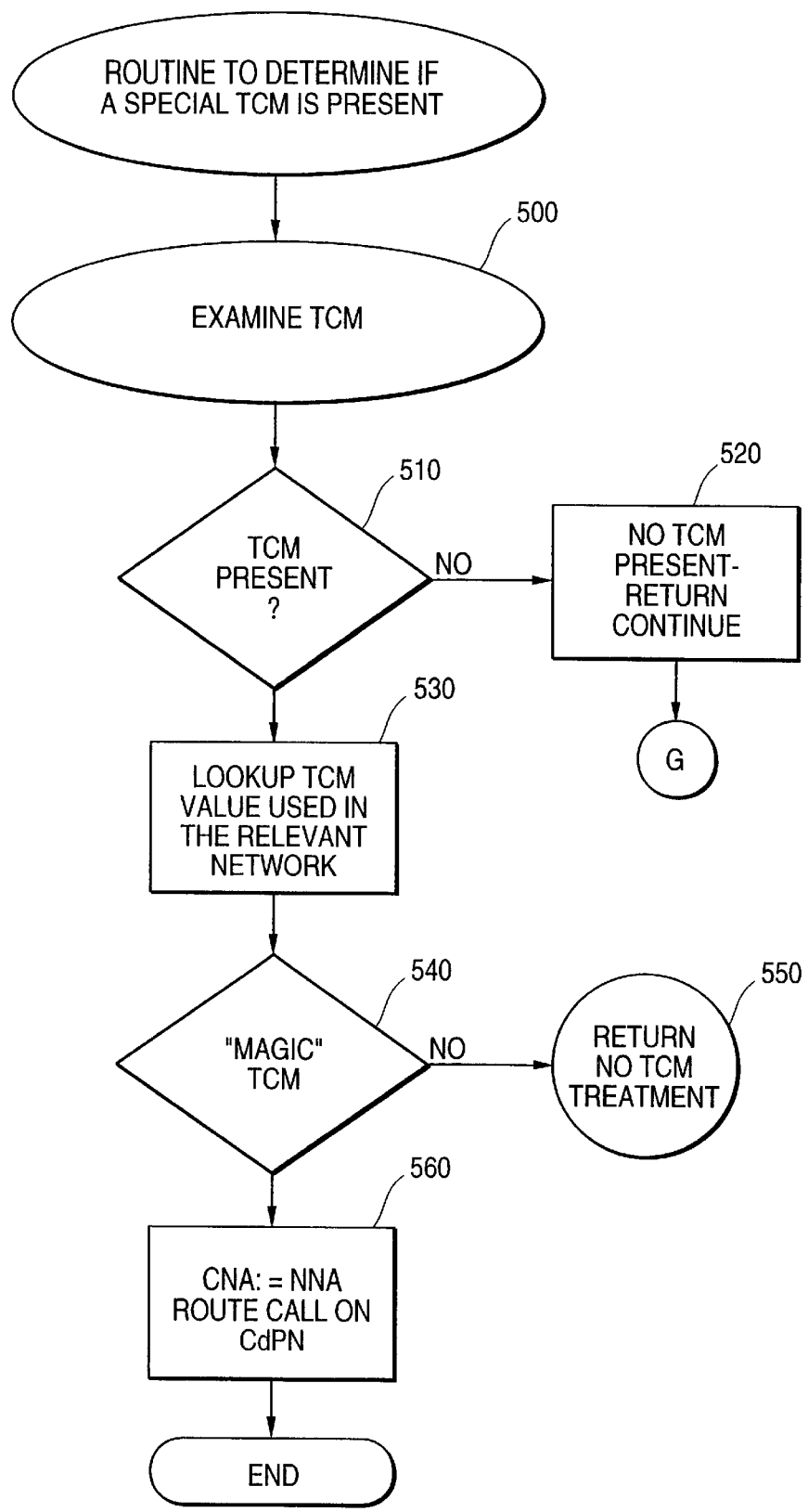
FIG. 12 is another flow chart that illustrates in detail the operations generally depicted in FIG. 5.
Figure 13:
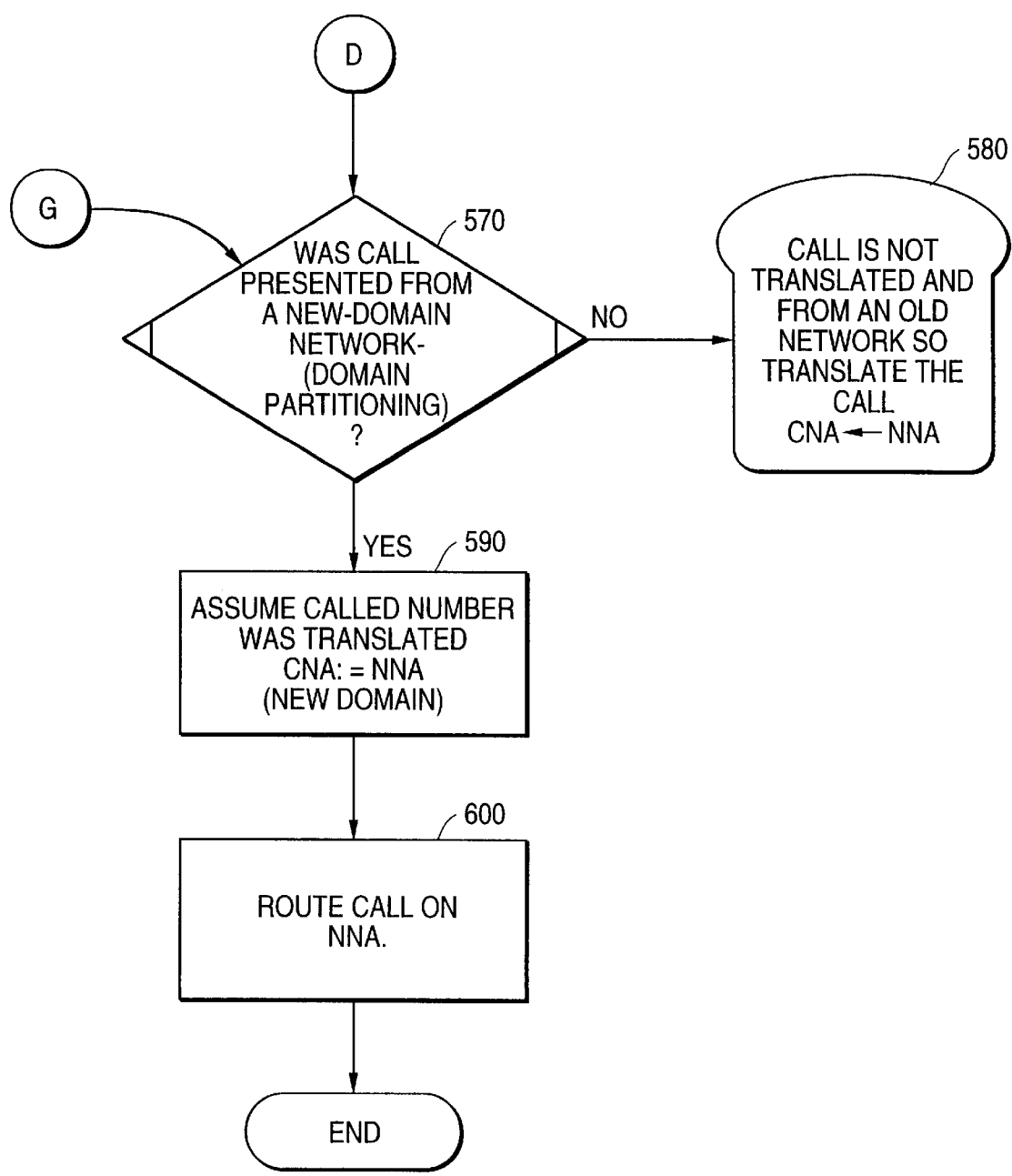
FIG. 13 is another flow chart that illustrates in detail the operations generally depicted in FIG. 5.

Referring now to FIGS. 11–13, therein provided are flow charts that expand operational steps 250 and 260 as originally shown in FIGS. 6 and 7, respectively. In particular, FIGS. 11–13 illustrate the operations of the present invention to carry out a database operation that has heretofore been referred to as a "dip" and to determine if such a dip had earlier been performed at another point in the call path. A dip is performed to basically do two things: (1) to determine if a dip has been previously done at another point along the call path for the particular call that is being routed, and (2) if a dip had not been previously performed, to map or translate the CNA to an NNA which may be used to route the call to a particular switching node and a particular line thereof.

Accordingly, at step 460 in FIG. 11 a determination is made as to whether the call signalling parameters contain a MAGIC ANI/II value. The term MAGIC refers to a value that has been designated by involved networks to indicate portability operations. The MAGIC value may or may not be standardized. The present invention's use of the ANI/II parameter is consistent with the use of the same within the PSTN. If such a value is include in the call signalling parameters, the CNA is perceived to be the NNA and, accordingly, a CONTINUE return code is returned from the database query processor performing the dip to the relevant switching node and the call is routed on the CdPN.

If the call signalling parameters do not contain a MAGIC ANI/II value, processing proceeds to step 480 wherein a determination is made as to whether the CNA contains an ISUP forward dip indicators, such as FCI or Nature of Number CdPN. If so, a CONTINUE return code is returned from the database query processor performing the dip to the relevant switching node and the call is routed on the CdPN.

If the CNA does not contain an ISUP forward dip indicator, processing proceeds to step 490 where a determination is made as to whether a special traveling class mark (TCM) is present in the call parameters. This determination is expanded in FIG. 12 as discussed below. If a TCM is present, a CONTINUE return code is returned from the database query processor performing the dip to the relevant switching node and the call is routed on the CdPN.

Referring momentarily to FIG. 12, therein provided is a flow chart that illustrates the operations to determine if a TCM is present in the call. First, at step 500, a TCM is examined. At step 510 a determination is made as to whether a special portability related TCM is present (e.g., a TCM of "69"). If no TCM is present, processing proceeds to step 520 where a RETURN code is sent back from the database server performing dip logic and processing continues at step 570 in FIG. 13.

If a special TCM is present, a subsequent database query is performed to look-up and scan for a TCM value used in the relevant network at step 530. Thereafter, processing proceeds to step 540 where a determination is made as to whether the TCM is a MAGIC (i.e., an agreed upon value among carriers) value which may or may not be optimized for number portability. If a MAGIC TCM is not present, a RETURN operation is performed and processing continues at step 570 in FIG. 13.

If a MAGIC TCM is present in the CNA, processing proceeds to step 560 where the CNA is replaced with the NNA as previously determined through database operations and the call is routed in the communications network based on the CdPN (i.e., the NNA).

If no special TCM is present with the CNA, processing proceeds to step 570 in FIG. 13 as suggested above for a last determination as to whether a dip has already been performed. At step 570, a determination is made as to whether the call and the CNA were presented at the current switching node that ordered the dip from a new domain network. This determination is made based on the trunk group identifier (TGID) which the call was received at the current switching node that is controlling the dip process (see FIG. 17 and the discussion thereof for more details). This determination allows the present invention to determine whether a dip has been previously done in the case of where the call parameters normally used for call state tracking as exemplified above may have been screened for the call leading to ambiguity regarding whether the call has already been dipped. If so, to prevent redundant and possibly erroneous processing and routing which may occur as a result of dipping an NNA instead of dipping a CNA.

If the call was not presented from a new domain network (i.e., from an old domain network which is not capable of database routing local number portability calls and terminating ported numbers), processing proceeds to step 580 where it is safely assumed that the call was not translated thereby requiring proper translation to occur (i.e., a CNA<— NNA).

If the call was presented from a new domain network, processing proceeds to step 590 where it is safely assumed that the CNA contains a NNA after proper translation and the call is properly routed on the NNA in the CNA at step 600.

Figure 14:
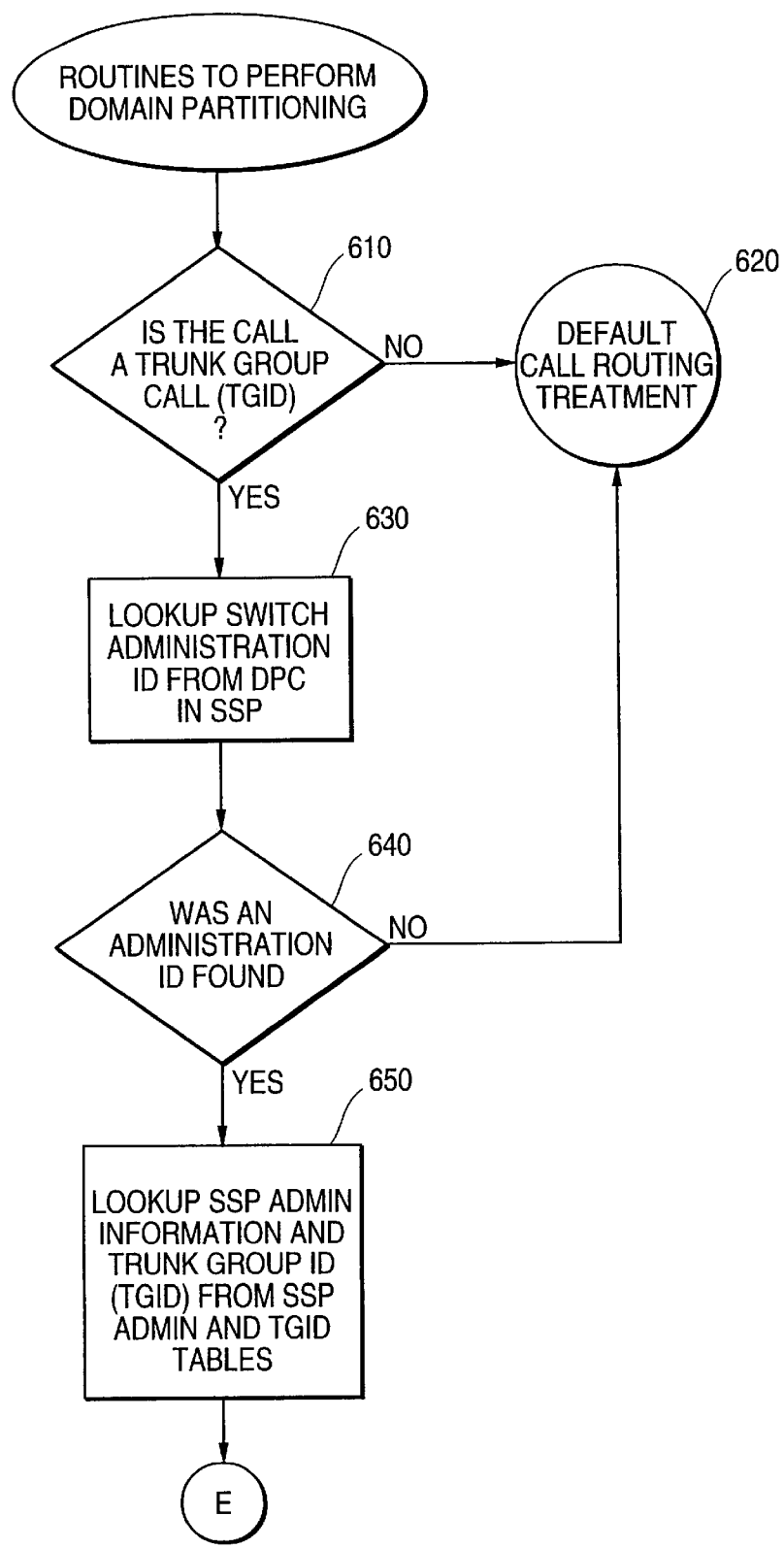
FIG. 14 is another flow chart that illustrates in detail the operations generally depicted in FIG. 5.
Figure 15:
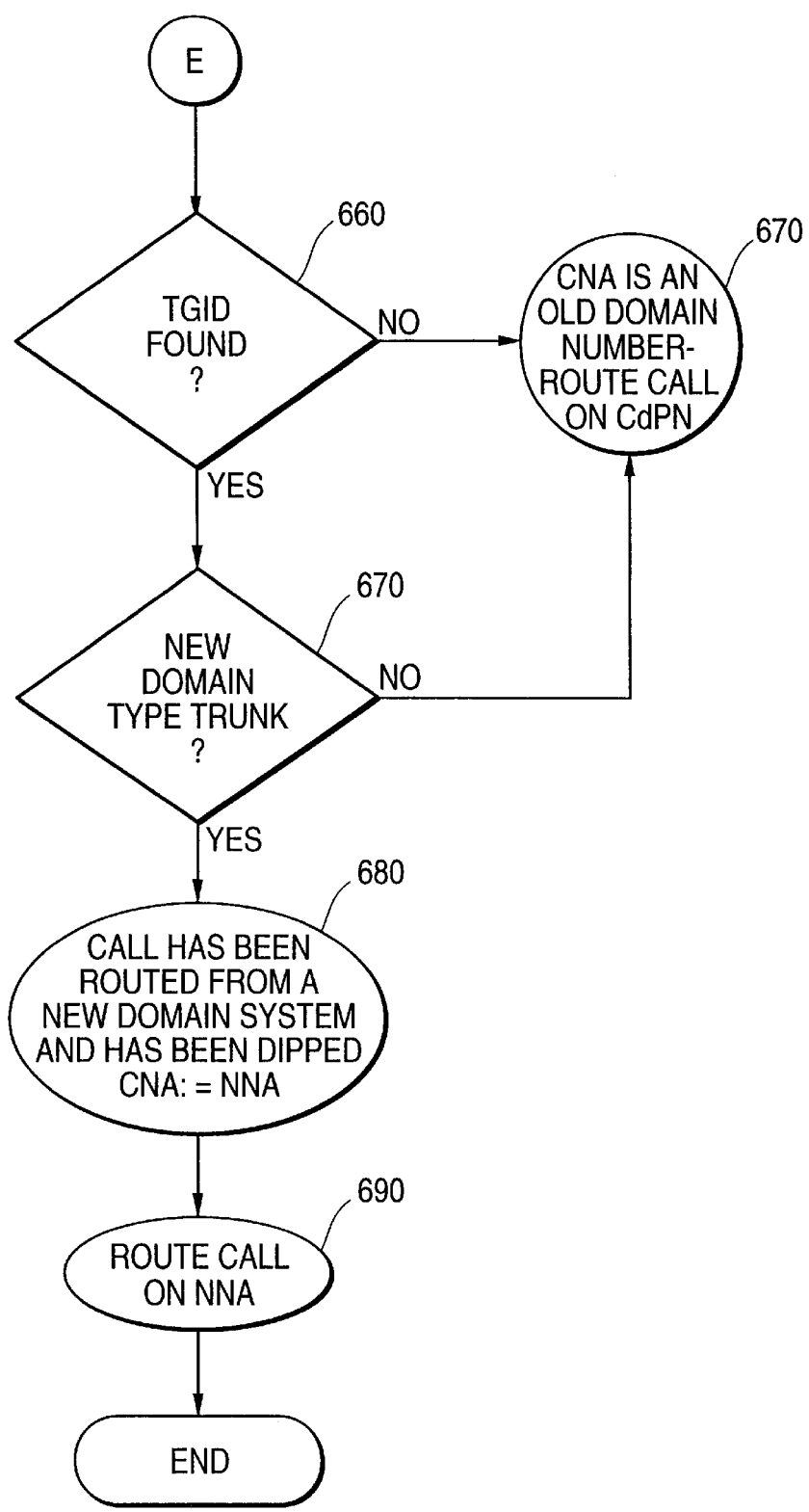
FIG. 15 is another flow chart that illustrates in detail the operations generally depicted in FIG. 5.

Referring momentarily to FIGS. 14 and 15, therein provided are flow charts that expand the operations carried out at step 570 to determine, during the dipping process, whether the call was presented at the current switching node from a new domain network or from an old domain network to effectuate domain partitioning to properly route the call in the communications network. The databases used to perform the present invention's domain partitioning operations (i.e., TRUNK GROUP CLASS MARKING via DBMS operations) are illustrated in detail in FIG. 18.

In particular, at step 610, a determination is made as to whether the call is a trunk group call on a particular trunk having a particular trunk group identifier (TGID). If not, processing proceeds to step 620 for default call processing (i.e., routing of the call occurs on the CdPN).

If the call is a trunk group call, processing proceeds to step 630 where a switch administration ID is scanned from a SS7 originating point code (OPC) table (SSPAdmPfx in FIG. 18) of the present switching node or SSP. Thereafter, processing proceeds to step 640, where a determination is made as to whether an administration record was found. If no record was found, processing proceeds to step 620 for appropriate treatment (i.e., default call processing such as routing the call on the CdPN).

If an administration record was found, a database query is launched in the SCP to look up or scan for an SSP admin information record and a trunk group ID (TGID) (TRUNKTABLES in FIG. 18).

If, at step 660 in FIG. 15, a TGID was not found during the aforementioned database query, processing proceeds to step 670 where the CNA is assumed to be an old domain number and the call therefore requires CNA to NNA translation prior to routing.

If a TGID was found, processing proceeds to step 670 where a determination is made as to whether the trunk is connected to a new domain network (i.e., has already been dipped). If the trunk group does not connect a new domain network based on the trunk group type flag, the CdPN is assumed to be an old domain and the CNA is translated to NNA.

If, at step 670, the trunk connects to a new domain network, processing proceeds to step 680 where it is safely assumed that the call has been routed from a new domain network or system and, accordingly, the call has already been dipped (i.e., properly translated). Thereafter, processing proceeds to step 690 where the call is routed on the NNA as previously retrieved.

Accordingly, steps 570–600 of FIG. 13 and steps 610–690 of FIGS. 14 and 15 illustrate an important aspect of the present invention. That is, steps 570–600 illustrate the operations that are detailed in the computer program listing appendix and which are carried out to bring about what the inventors have termed "domain partitioning." That is, by determining whether a call at a particular switching node (e.g., a LEC and/or SSP) was received at such switching node on a trunk group that was tied to a new domain network, it can safely be assumed that the call was translated. On the other hand, if the call was received on a trunk group that is tied to an old domain network switching system, then it can safely be assumed that the call was not previously translated. As such, the domains are effectively and appropriately separated or partitioned to make certain assumptions about the translation status of a given dialed number or CNA. Additionally, such domain partitioning allows the present invention to realize local area number portability without performing redundant dips or translations which can bring about a waste of system resources and erroneous call processing and routing.

Referring now to FIG. 16, therein provided is a flow chart that illustrates the operations carried out by the presently preferred embodiments of the present invention to bring about portable number routing in a communications network as the PSTN. Processing begins at step 700 where the NNA from the database after the dip was performed is placed into the CdPN in response message field "xlation".

Thereafter, at step 710, the CNA (which now contains the NNA as a result of the dip as discussed above) is placed in the generic address parameter (GAP of SS7/ISUP) (TCM in AIN 0.1).

At step 720, the ANI/II value is set to the MAGIC value and at step 730, the FCI and the nature-of-number are both set to the CdPN.

At step 740, a response message is sent from the database server to the switching node or SSP for appropriate call routing of the call on the NNA.

Figure 17:
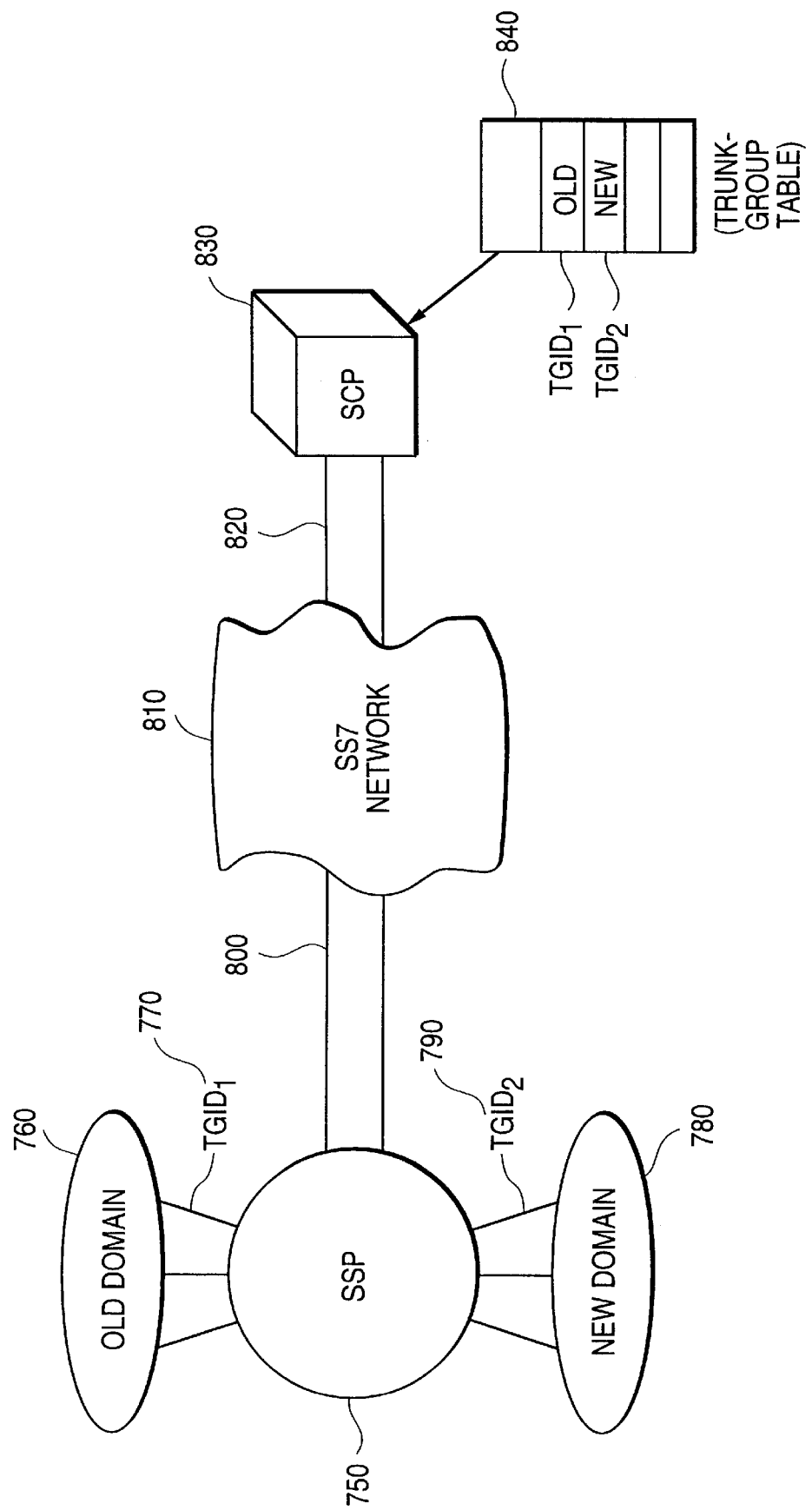
FIG. 17 is a diagram that illustrates the origination and routing of calls within a communications network including calls from new and old domain switching networks.

Referring now to FIG. 17, therein depicted is a diagram that illustrates the origination and routing of calls within a communications network including calls from new and old domain switching networks.

In particular, a call may be initiated from an old domain network 760 which is connected to switching complex containing an SSP 750 via a trunk group having a trunk group identification number TGID1 770. The trunk group identification number TGID1 770 may also be referred to a facility identification number. Old domain network 760 is, itself, not capable of translating or terminating ported numbers. The SSP, via SS7 communication links 810, 820 (e.g., A-Links) communicates over SS7 Network 810 to communicate with an SCP 830. SCP 830 has the capability to determine if the call was received at SSP 750 from either an old domain or new domain network via database operations related to TRUNK GROUP TABLE 840.

TRUNK GROUP TABLE 840 contains records that indicate if the trunk group on which SSP 750 received the call was either a new domain network call or an old domain network call. As such, by determining whether the call was received from a new domain network or from an old domain network, it is possible to determine if a call had been previously translated and that a CNA has been mapped to NNA or that such a translation must occur.

Referring now to FIG. 18, therein depicted are database structures that SCP 830 (FIG. 17) may actually use to determine the trunk group status of an incoming call to SSP 750 (FIG. 17) to perform domain partitioning to determine if a call requires translation or not.

The usage of the database structures (tables) of FIG. 18 were explained in regard to the FIGS. 14 and 15.

Although preferred embodiments of the present invention have been shown and described as illustrated herein and in the microfiche appendix hereto, the present invention is not so limited. In fact many changes and modifications may be made to the present invention without departing from the spirit of principles of the same which are defined in the appended claims and their equivalents.

What is claimed is:

1. A method of routing a call based upon a call connection request including a called number in a communications network, comprising the steps of:

determining if said called number is equal to a network routing number by examining a call signalling parameter associated with said called number and routing said call within said communications network based on said called number when said called number is equal to said network routing number; and identifying said network routing number based upon said called number when said called number is not equal to said network routing number and routing said call within said communications network based on the identified network routing number.

2. The method of claim 1, wherein said identifying step is carried out at a first switching node having a first incoming line having a first incoming line facility identifier and wherein said identifying step identifies said network routing number based on said first incoming facility identifier.

3. The method of claim 1, wherein said determining step is carried out at a first switching node having a first incoming facility having a first incoming facility identifier and wherein said determining step determines if said called number is equal to said network routing number based on said first incoming facility identifier.

4. The method of claim 1, wherein said called number is a standard ten digit number.

5. The method of claim 1, wherein said network routing number is a standard ten digit number.

6. The method of claim 1, wherein said called number and said network routing number have the same format.

7. The method of claim 1, further comprising the step of determining whether a set of call parameters associated with said called number includes the call signalling parameter indicating that said called number is a ported number and if said parameter exists, immediately carrying out said identifying step without carrying out said determining if said called number is equal to said network routing number.

8. The method of claim 7, wherein said identifying step is carried out at a first switching node having a first incoming facility having a first incoming facility identifier and wherein said identifying step identifies said network routing number based on said first incoming facility identifier.

9. The method of claim 1, further comprising the step of determining whether said called number indicates that a toll call is to be placed and if said toll call is to be placed, routing said called number through toll call channels without performing said determining and said identifying steps.

10. The method of claim 1, wherein said determining step determines if said called number is a network routing number based on a facility on which said call connection request was received at a capable switching node of said communications network.

11. A method of routing a call based upon a call connection request including a called number in a communications network, comprising the steps of:

determining if said called number is equal to a network routing number and routing said call within said communications network based on said called number when said called number is equal to said network routing number;

identifying said network routing number based upon said called number when said called number is not equal to said network routing number and routing said call within said communications network based on the identified network routing number; and transforming said called number into a customer number address (CNA), wherein said determining step involves determining if said CNA is equal to said network routing number and said identifying step is carried out with respect to said CNA.

12. A method of routing calls within a communications network interconnecting a plurality of switching nodes wherein at least some switching nodes of said plurality of switching nodes being capable of routing and terminating ported numbers, said method comprising the steps of:

generating a call connection request including a called number;

determining if said called number matches a trigger indicating that said called number may be a ported number and routing said call based on said called number when said called number does not match said trigger;

determining if the called number has been translated into a network routing number when it has been determined that said called number matches said trigger; and translating said called number into a translated network routing number when it has been determined that said called number had not earlier been translated and routing the call based on said translated network routing number.

13. A method of routing a call including a called number in a communications network, comprising the steps of:

determining if said call is from a first domain of said communications network as indicated by a call signalling parameter associated with and separate from said called number; and translating said called number into a network routing number responsive to the determination said call is from said first domain.

14. The method of claim 13, further comprising the step of:

routing said call within said communications network based on said network routing number.

15. The method of claim 13, wherein said called number and said network routing number have the same format.

16. A method of routing a call in a communication network, comprising;

determining whether a call signalling parameter associated with and separate from a called number indicates that the number is a network routing number;

translating the called number into the network routing number responsive to the the determination that the called number is not the network routing number; and routing the call using the network routing number.

* * * * *

UNITED STATES PATENT AND TRADEMARK OFFICE
CERTIFICATE OF CORRECTION

| | |
|---|---|
| PATENT NO. | : 5,940,490 |
| APPLICATION NO. | : 08/519061 |
| DATED | : August 17, 1999 |
| INVENTOR(S) | : Mark D. Foster et al. |

It is certified that error appears in the above-identified patent and that said Letters Patent is hereby corrected as shown below:

In claim 1, line 6, after "with" insert -- and separate from --;
In claim 7, line 3, replace "the" with -- a --;
In claim 7, line 5, before "parameter" insert -- call signalling --;
In claim 7, line 6, before "determining" insert -- step of --;
In claim 11, line 15, delete "involves";
In claim 11, line 16, replace "determining" with -- determines --;
In claim 13, line 8, replace "responsive to the determination" with -- if said determining step determines that --;
In claim 16, line 7, replace "responsive to the the determination" with -- if said determining determines --.

Signed and Sealed this
First Day of March, 2011

David J. Kappos
*Director of the United States Patent and Trademark Office*

UNITED STATES PATENT AND TRADEMARK OFFICE
CERTIFICATE OF CORRECTION

PATENT NO.        : 5,940,490
APPLICATION NO.   : 08/519061
DATED             : August 17, 1999
INVENTOR(S)       : Mark D. Foster et al.

Page 1 of 1

It is certified that error appears in the above-identified patent and that said Letters Patent is hereby corrected as shown below:

Column 17, line 40 (claim 1, line 6) after "with" insert -- and separate from --;
Column 18, line 3 (claim 7, line 3) replace "the" with -- a --;
Column 18, line 5 (claim 7, line 5) before "parameter" insert -- call signalling --;
Column 18, line 6 (claim 7, line 6) before "determining" insert -- step of --;
Column 18, line 41 (claim 11, line 15) delete "involves";
Column 18, line 42 (claim 11, line 16) replace "determining" with -- determines --;
Column 19, line 8 (claim 13, line 8) replace "responsive to the determination" with -- if said determining step determines that --;
Column 20, line 3, claim 16, line 7) replace "responsive to the the determination" with -- if said determining determines --.

This certificate supersedes the Certificate of Correction issued March 1, 2011.

Signed and Sealed this
Fifth Day of April, 2011

David J. Kappos
*Director of the United States Patent and Trademark Office*